US011768119B2

(12) United States Patent
Datlen et al.

(10) Patent No.: US 11,768,119 B2
(45) Date of Patent: Sep. 26, 2023

(54) THERMAL BARRIER BETWEEN HIGH-TEMPERATURE SENSOR AND ELECTRONICS IN A CAPACITANCE DIAPHRAGM GAUGE

(71) Applicant: SUMITOMO (SHI) CRYOGENICS OF AMERICA, INC., Allentown, PA (US)

(72) Inventors: Matt Datlen, San Diego, CA (US); Kurt Rustin, San Diego, CA (US)

(73) Assignee: SUMITOMO (SHI) CRYOGENICS OF AMERICA, INC., Allentown, PA (US)

(*) Notice: Subject to any disclaimer, the term of this patent is extended or adjusted under 35 U.S.C. 154(b) by 231 days.

(21) Appl. No.: 17/297,962

(22) PCT Filed: Feb. 25, 2020

(86) PCT No.: PCT/US2020/019688
§ 371 (c)(1),
(2) Date: May 27, 2021

(87) PCT Pub. No.: WO2020/176495
PCT Pub. Date: Sep. 3, 2020

(65) Prior Publication Data
US 2022/0090974 A1 Mar. 24, 2022

Related U.S. Application Data

(60) Provisional application No. 62/810,798, filed on Feb. 26, 2019.

(51) Int. Cl.
*G01L 9/00* (2006.01)
*G01L 19/00* (2006.01)
*G01L 19/06* (2006.01)

(52) U.S. Cl.
CPC ........ *G01L 9/0072* (2013.01); *G01L 19/0092* (2013.01); *G01L 19/0681* (2013.01)

(58) Field of Classification Search
None
See application file for complete search history.

(56) References Cited

U.S. PATENT DOCUMENTS 5,625,152 A * 4/1997 Pandorf ................ G01L 9/0072
73/756
5,808,206 A * 9/1998 Pandorf .................. B32B 5/022
73/756

(Continued)

FOREIGN PATENT DOCUMENTS

CN 1178005 A 4/1998
CN 101254579 A 9/2008

(Continued)

OTHER PUBLICATIONS

Extended European Search Report dated Oct. 25, 2022, for the Corresponding European Patent Application No. 20762781.1.

(Continued)

*Primary Examiner* — Lisa M Caputo
*Assistant Examiner* — Nigel H Plumb
(74) *Attorney, Agent, or Firm* — Katten Muchin Rosenman LLP

(57) ABSTRACT

A capacitive diaphragm gauge (CDG) is positioned in a pressure sensing section of a pressure measuring unit. The CDG is heated to maintain the CDG at a temperature selected to reduce contamination build-up on the diaphragm of the CDG. The pressure sensing section is connected to a first mounting interface of a thermal barrier. A second mounting interface of the thermal barrier is connected to an electronics section. The thermal barrier includes a plurality of struts that mechanically interconnect the two mounting interfaces. The struts have sizes selected to be sufficiently (Continued)

large to cantilever the electronics section from the sensing section. The sizes of the struts are selected to be sufficiently small to reduce the heat transfer from the first mounting interface to the second mounting interface to maintain the second mounting interface below a selected maximum temperature. The struts reduce heat transfer without reducing structural integrity.

20 Claims, 14 Drawing Sheets

(56) References Cited

U.S. PATENT DOCUMENTS

| | | | | |
|---|---|---|---|---|
| 7,124,640 | B1 * | 10/2006 | Miller | G01L 19/148 |
| | | | | 73/756 |
| 7,201,057 | B2 * | 4/2007 | Agami | G01L 19/04 |
| | | | | 73/756 |
| 2002/0083774 | A1 * | 7/2002 | Poulin | G01L 9/0075 |
| | | | | 73/708 |
| 2010/0186516 | A1 * | 7/2010 | Hanselmann | G01L 9/0075 |
| | | | | 73/718 |

FOREIGN PATENT DOCUMENTS

| | | |
|---|---|---|
| CN | 103929925 A | 7/2014 |
| CN | 203848247 U | 9/2014 |
| JP | 3334888 B2 | 10/2002 |
| JP | 2004-506890 A | 3/2004 |
| JP | 4437336 B2 | 3/2010 |
| JP | 1988732 B2 | 8/2012 |
| JP | 2014-126503 A | 7/2014 |
| JP | 5576331 B2 | 8/2014 |
| JP | 3100986 B2 | 10/2020 |
| WO | 02/14821 A2 | 2/2002 |
| WO | 2007/008388 A1 | 1/2007 |

OTHER PUBLICATIONS

International Search Report and Written Opinion dated Jun. 24, 2020, from PCT/US2020/019688, 11 sheets.
Chinese Office Action dated Aug. 17, 2022, for the Corresponding Chinese Patent Application No. 202080007696.4.
Japanese Notification of Decision to Grant dated Aug. 23, 2022, for the Corresponding Japanese Patent Application No. 2021-549950.
Korean Office Action dated Oct. 19, 2022, for the Corresponding Korean Patent Application No. 10-2021-7024595.
Chinese Office Action dated Mar. 27, 2023, for the Corresponding Chinese Patent Application No. 202080007696.4.
Korean Office Action dated Mar. 28, 2023, for the Corresponding Korean Patent Application No. 10-2021-7024595.

* cited by examiner

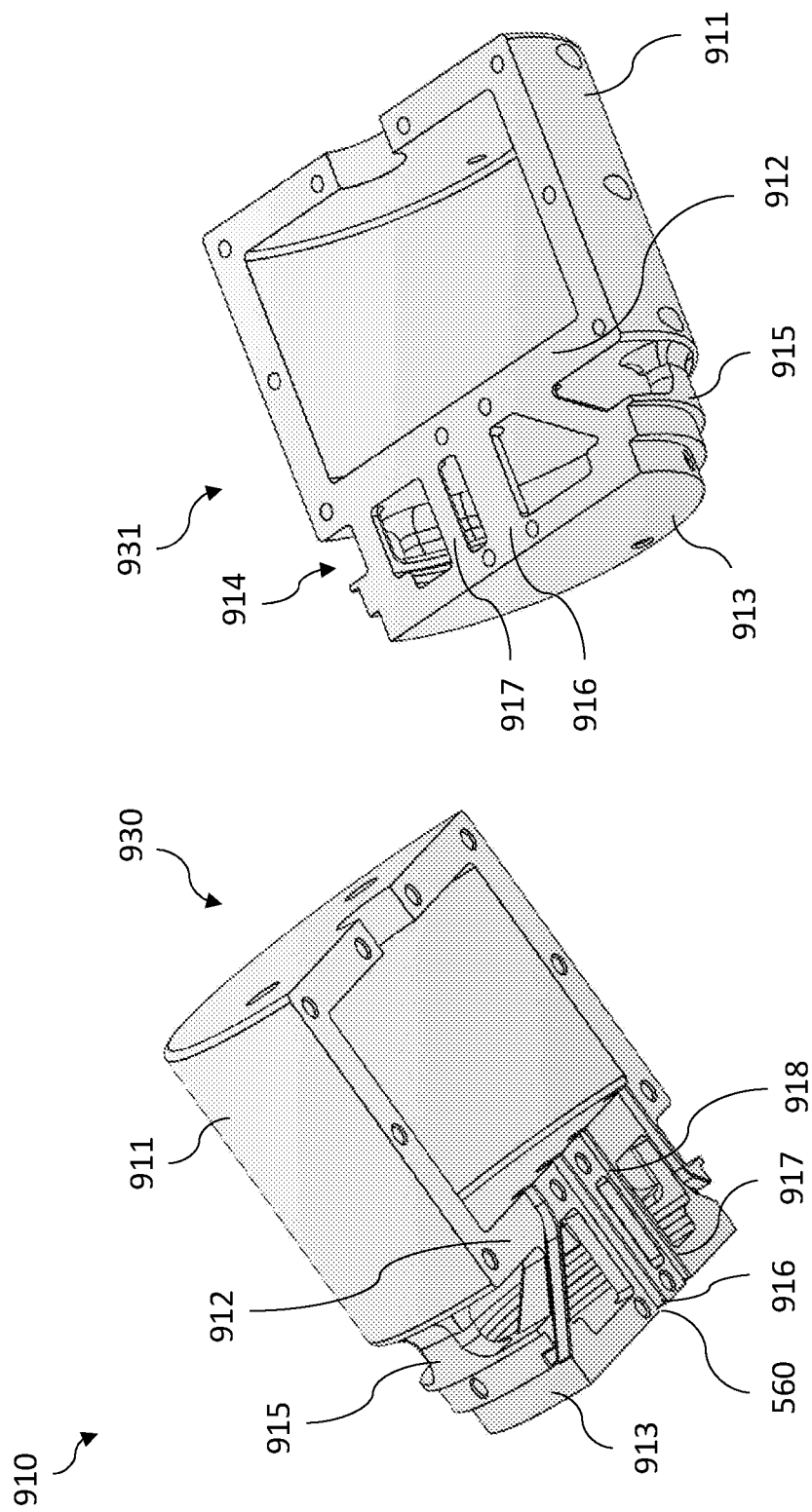

THERMAL BARRIER BETWEEN HIGH-TEMPERATURE SENSOR AND ELECTRONICS IN A CAPACITANCE DIAPHRAGM GAUGE

CROSS REFERENCE TO RELATED APPLICATIONS

This application claims the priority of U.S. Provisional Application Ser. No. 62/810,798, filed on Feb. 26, 2019, which is hereby incorporated herein by reference in its entirety.

FIELD OF THE INVENTION

The present invention is in the field of capacitance diaphragm gauges that measure pressure based on the deflection of a diaphragm.

DESCRIPTION OF THE RELATED ART

Absolute capacitance diaphragm gauges (CDGs) measure pressure by sensing the capacitance change associated with deflection of a diaphragm whereby one side (the pressure side) of the diaphragm is exposed to the pressure to be measured and the other side of the diaphragm is exposed to a sealed reference vacuum cavity in which an ultrahigh vacuum (e.g., less than $10^{-9}$ Torr) has been created prior to the sealing of the reference cavity.

The CDG measures capacitance between a diaphragm and one or more fixed electrodes housed in the reference vacuum cavity. When the pressure on the pressure side of the diaphragm is higher than the pressure in the reference vacuum cavity, the diaphragm deflects in the direction of the fixed electrode (or electrodes), which increases the measured capacitance. As the pressure on the pressure side of the diaphragm decreases, the pressure differential across the diaphragm diminishes and the diaphragm moves away from the fixed electrode (or electrodes) in the reference vacuum cavity, which reduces the measured capacitance.

CDGs are commonly used to measure pressure in vacuum chambers in which thin or thick films of material are deposited on a substrate. One common example of usage is to measure pressure during the deposition of materials onto the surface of silicon wafers during the fabrication of semiconductor devices. CDGs are quite useful in vacuum deposition processes that utilize multiple gasses because capacitance diaphragm gauges are highly accurate and are able to measure absolute pressure independent of gas composition. Unfortunately, the same characteristics of the CDG that enable the CDG to operate in the pressure regimes in which vacuum deposition is typically carried out also make the CDG extremely sensitive to any form of contamination or coating that finds its way onto the surface of the diaphragm.

Diaphragm contamination or coating can negatively impact the sensitivity and accuracy of the CDG and can also result in a shift in the zero point of the CDG. Several other commonly encountered phenomena can also impact the sensitivity, the accuracy and the zero point of the CDG. CDGs are being used more frequently in processes, such as semiconductor wafer processing, some of which can be extremely sensitive to output shifts in the vacuum measurement. The effects of diaphragm contamination or diaphragm coating on the accuracy and repeatability of the CDG are known to be significant enough to impact process results and process yields. One cause of diaphragm contamination is the condensation of gaseous byproducts that have a greater propensity to react with and adhere to a cooler metal surface such as a diaphragm. As a result, users of CDGs have attempted to mitigate the chance of diaphragm contamination or coating by elevating the temperature of the diaphragm to reduce or eliminate the condensation. While this technique has long been used and has a positive effect, the technique has not eliminated the occurrence of diaphragm contamination or coating. Heretofore, the maximum temperature of the diaphragm has been limited by the electronics used to process the capacitive signal from the diaphragm. Because the electronics must be located close to the diaphragm, the electronics receives thermal energy from the heated diaphragm, which increases the temperature of the electronics. The increased temperature may adversely affect the accuracy of the electronics and may also affect the reliability of heat-sensitive components incorporated into the electronics.

Techniques have been used to actively remove heat away from the electronics or to passively thermally insulate the electronics from the heated diaphragm; however, known techniques are limited by a maximum heat differential between the electronics and the diaphragm.

SUMMARY

A need exists for improvements to CDGs whereby a diaphragm can be heated to a much higher temperature than previously feasible while maintaining the electronics in close proximity to the diaphragm and while maintaining the electronics and the exposed outer surfaces of the CDG to an acceptable safe maximum magnitude.

These and other advantages may be provided by, for example, a thermal barrier enclosure to interconnect a CDG operating at a first temperature with an electronics enclosure operating at a second temperature, where the first temperature is greater than the second temperature. The thermal barrier enclosure includes a side wall surrounding the CDG, a first wall configured to mechanically engage the CDG, a second wall configured to engage the electronics enclosure, and an intermediate thermal restriction and ventilation portion interconnecting the first wall and the second wall. The second wall is spaced apart from the first wall. The intermediate thermal restriction and ventilation portion includes a plurality of struts.

The first wall may have a central through bore, and each strut may be positioned along a respective strut radial line extending from the central through bore. Alternatively, each strut may be positioned along a first circle centered on the central through bore. The struts may be connected to the first wall and the second wall. The thermal barrier enclosure may further include a central interconnection strut that is connected to the first wall and the second wall. A central through bore may be formed inside the central interconnection strut. The intermediate thermal restriction and ventilation portion may have a total volume between the first wall and the second wall, the plurality of struts may have a total strut volume, and the total strut volume may be in a range of approximately 15 percent to approximately 25 percent of the total volume.

These and other advantages may be provided by, for example, a pressure sensing system that includes a CDG operating at a first temperature, an electronics enclosure operating at a second temperature, and a thermal barrier enclosure housing the CDG and interconnecting the CDG to the electronics enclosure. The CDG is capable of coupling to a source of a pressure to be measured, and the electronics enclosure encloses electronics that are electrically coupled to the CDG. The first temperature is greater than the second temperature. The thermal barrier enclosure includes a side wall surrounding the CDG, a first wall configured to mechanically engage the CDG, a second wall configured to engage the electronics enclosure, and an intermediate thermal restriction and ventilation portion interconnecting the first wall and the second wall. The second wall is spaced apart from the first wall. The intermediate thermal restriction and ventilation portion includes a plurality of struts.

These and other advantages may be provided by, for example, a thermal barrier to interconnect a CDG operating at a first temperature with an electronics enclosure operating at a second temperature, where the first temperature greater than the second temperature. The thermal barrier includes a first mounting interface configured to mechanically engage the CDG, a second mounting interface configured to engage the electronics enclosure, and an intermediate thermal restriction and ventilation portion interconnecting the first mounting interface and the second mounting interface. The second mounting interface is spaced apart from the first mounting interface. The intermediate thermal restriction and ventilation portion includes a plurality of struts.

The intermediate thermal restriction and ventilation portion may have a total volume between the first mounting interface and the second mounting interface. The plurality of struts may have a total strut volume, and the total strut volume may be in a range of approximately 30 percent to approximately 50 percent of the total volume. The total strut volume may be approximately 40 percent of the total volume. The plurality of struts may include a plurality of outer interconnection struts, and a plurality of internal interconnection struts. The outer interconnection struts may be spaced apart to provide ventilation ports between adjacent outer interconnection struts. The internal interconnection struts may be spaced apart from each other and may be spaced apart from the ventilation ports to enable air flow through the intermediate thermal restriction and ventilation portion. The plurality of struts may further include a central interconnection strut. The central interconnection strut may surround a through bore that extends from the first mounting interface to the second mounting interface. Each of the first mounting interface and the second mounting interface may have a respective central through bore, each outer interconnection strut may be positioned along a respective outer interconnection strut radial line extending from the central through bore, and each internal interconnection strut may be positioned along a respective internal strut radial line extending from the central bore. Each internal strut radial line positioned substantially equiangularly between a respective first outer interconnection strut radial line and a second outer interconnection strut radial line. Each of the first mounting interface and the second mounting interface may have a respective central through bore, each outer interconnection strut may be positioned along a first circle centered on the central through bore, the first circle having a first radius, and each internal strut may be positioned along a second circle centered on the central through bore. The second circle may have a second radius that is smaller than the first radius.

BRIEF DESCRIPTIONS OF THE DRAWINGS

The foregoing and other features of embodiments disclosed herein are described below in connection with the accompanying drawings.

Figure 10:
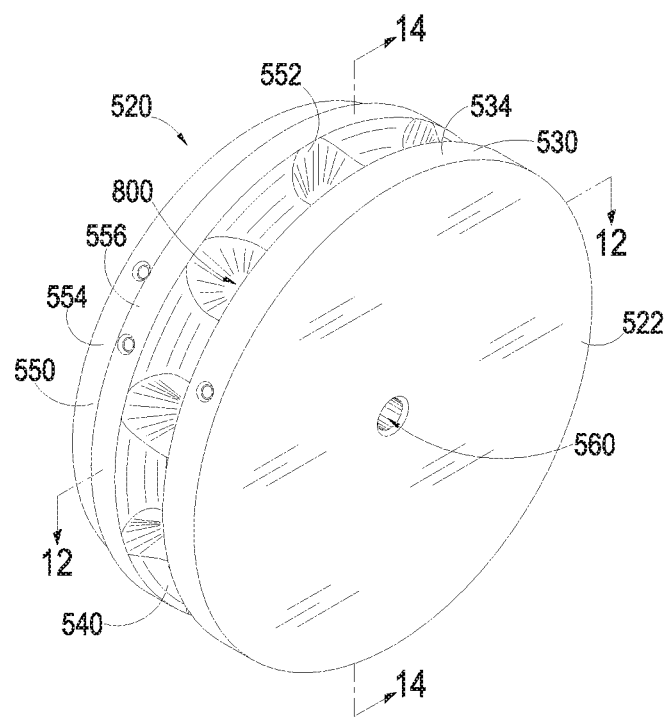
FIG. 10 illustrates a perspective view of the thermal barrier looking toward the proximal surface of the thermal barrier.
Figure 11:
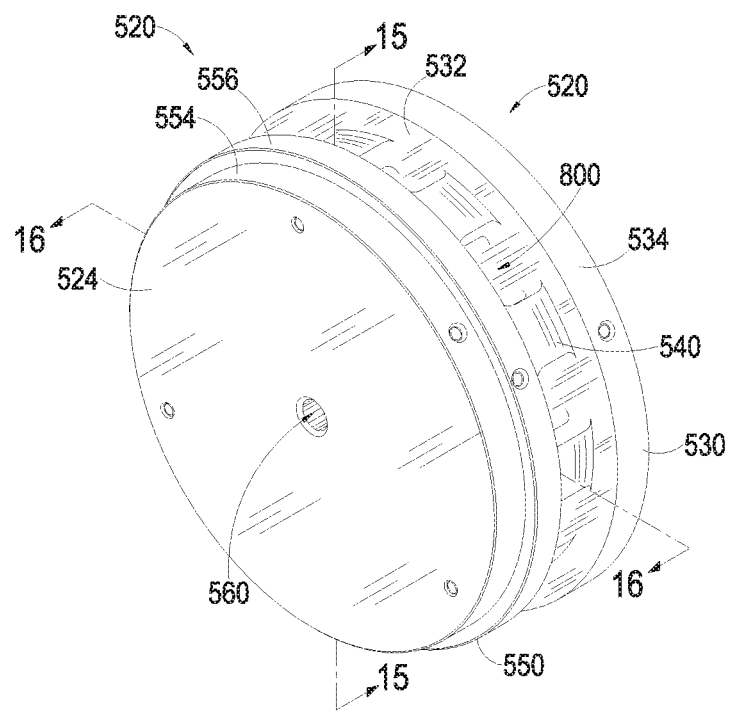
FIG. 11 illustrates a perspective view of the thermal barrier looking toward the distal surface of the thermal barrier.
Figure 12:
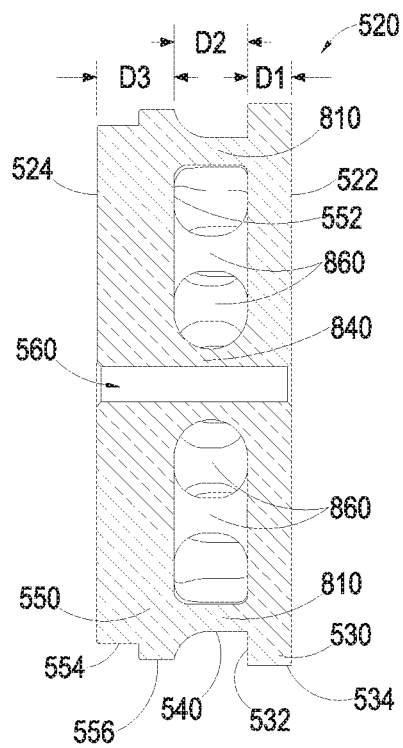
FIG. 12 illustrates a cross-sectional plan view of the lower portion of the thermal barrier of FIGS. 10 and 11, the view along the line 12-12 in FIG. 10.
Figure 15:
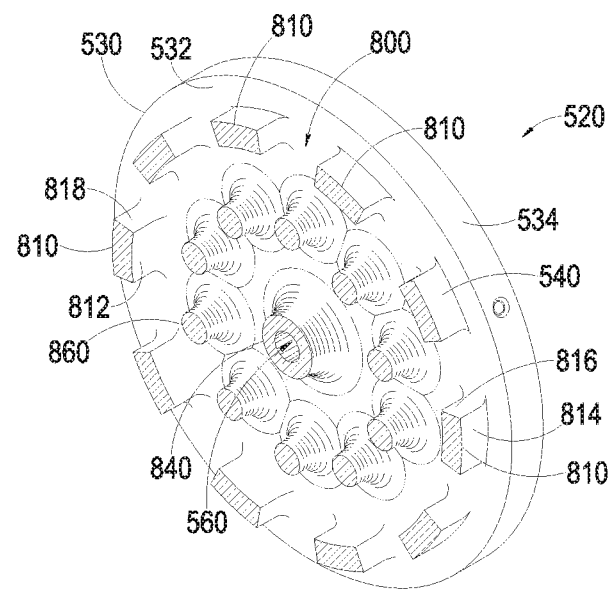

FIG. 15 illustrates a perspective cross-sectional view of the thermal barrier of FIGS. 10 and 11, the view taken along the line 15-15 in FIG. 11 and looking from near the middle of the thermal barrier toward the proximal portion of the thermal barrier, the view showing the proximal portions of the interconnection struts forming the intermediate thermal restriction and ventilation portion of the thermal barrier.

Figure 16:
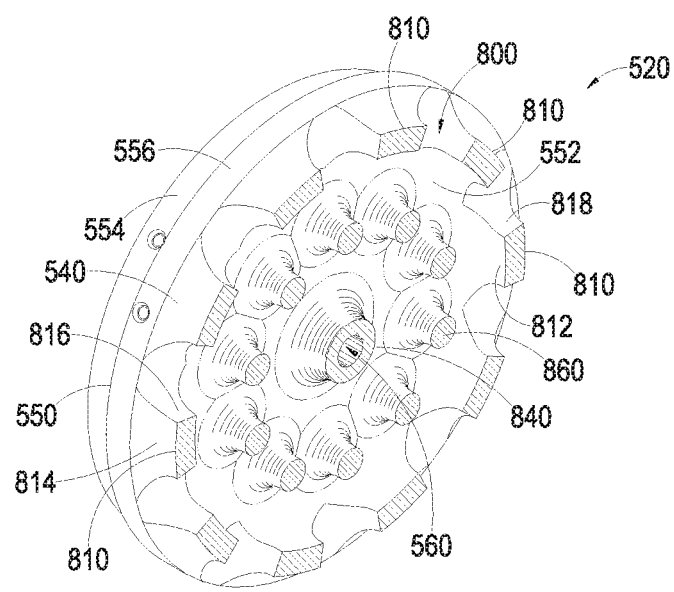

FIG. 16 illustrates a perspective cross-sectional view of the thermal barrier of FIGS. 10 and 11, the view taken along the line 16-16 in FIG. 11 and looking from near the middle of the thermal barrier toward the distal portion of the thermal barrier, the view showing the distal portions of the interconnection struts forming the intermediate thermal restriction and ventilation portion of the thermal barrier.

Figure 17:
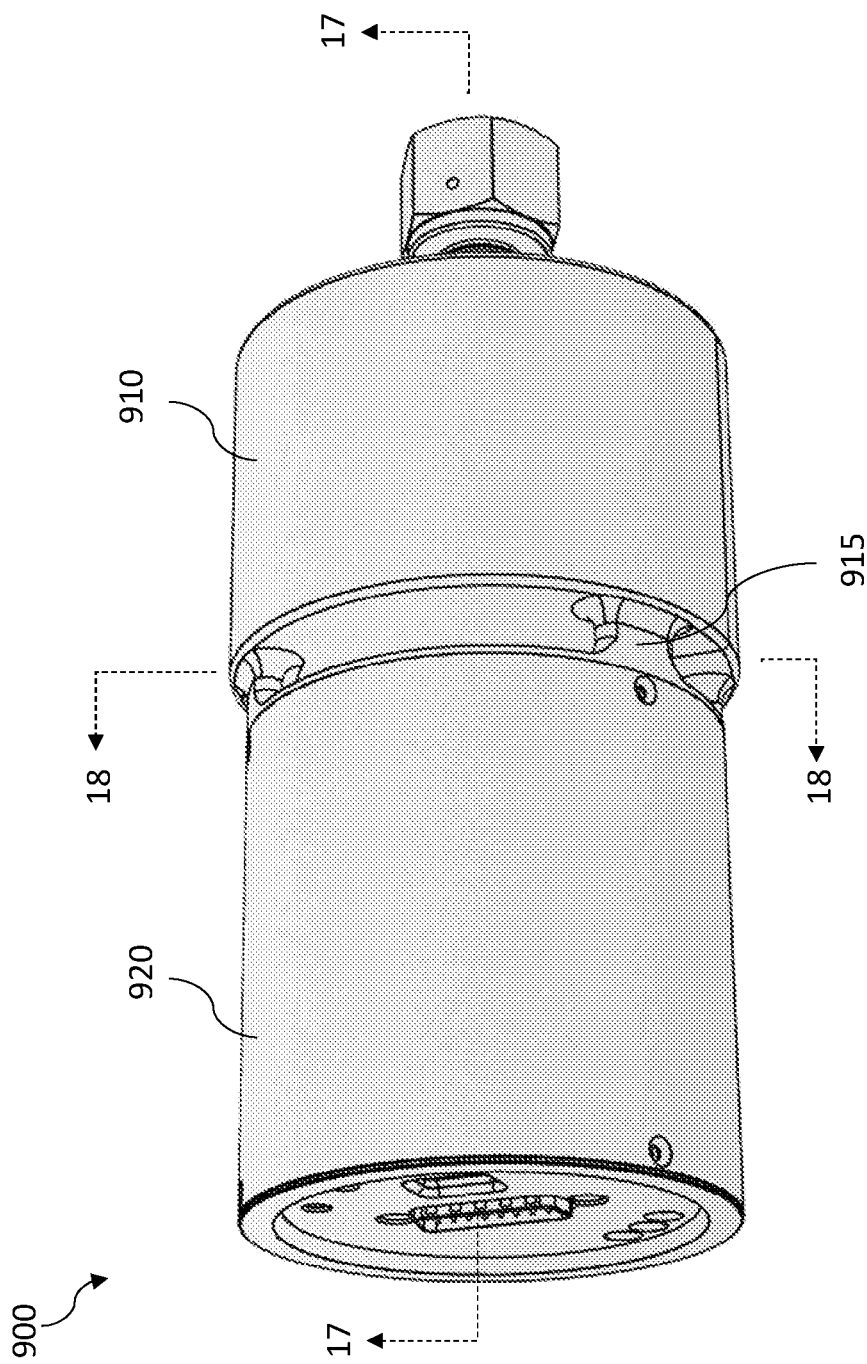

FIG. 17 illustrates a perspective view of an embodiment of a thermal barrier enclosure.

Figure 18:
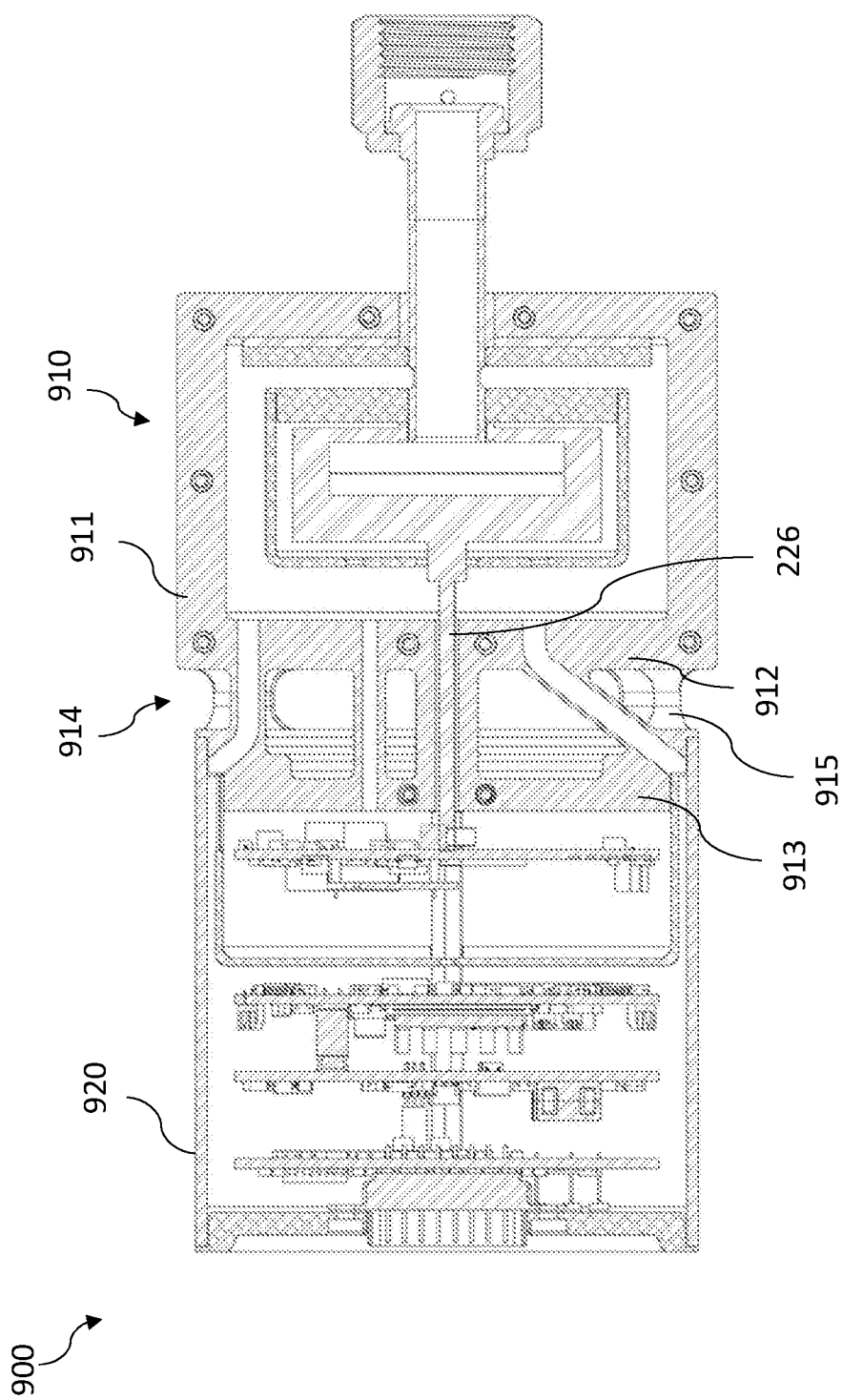

FIG. 18 illustrates a cross-sectional view of the embodiment of the thermal barrier enclosure taken along the line 17-17 in FIG. 17.

FIGS. 19A-19B illustrate perspective views of top and bottom portions of the thermal barrier enclosure.

Figure 20B:
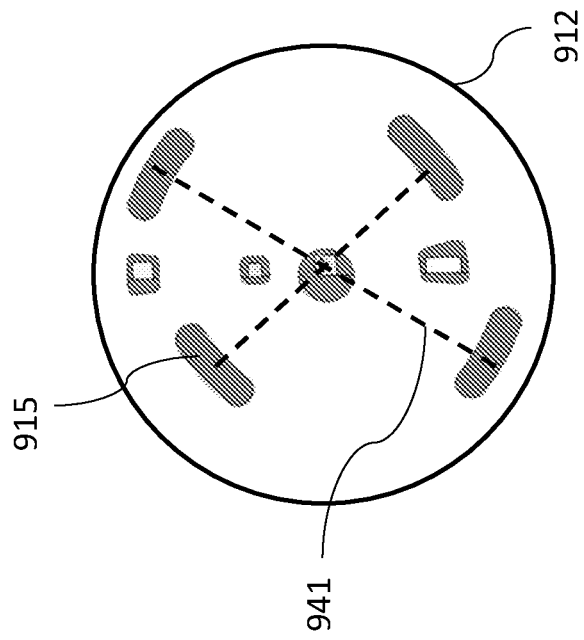
Figure 20A:
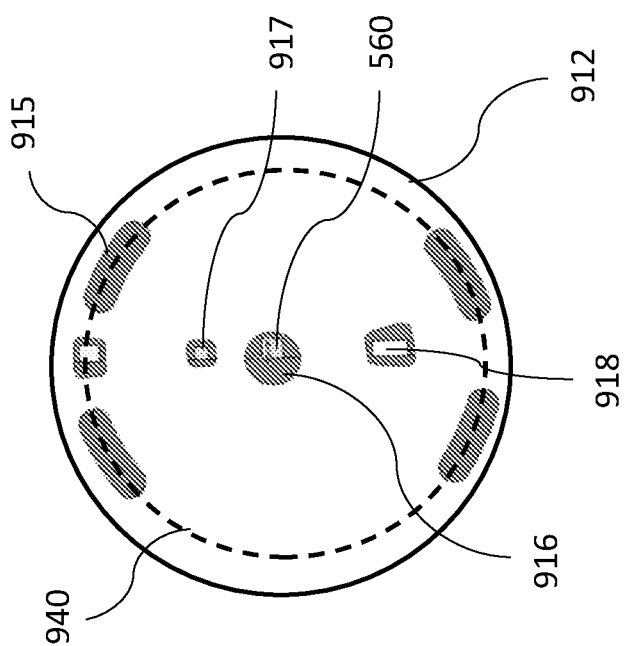

FIGS. 20A-20B illustrate cross-sectional views of the thermal barrier enclosure taken along the line 18-18 in FIG. 17.

DETAILED DESCRIPTION OF DISCLOSED EMBODIMENTS

Figure 1:
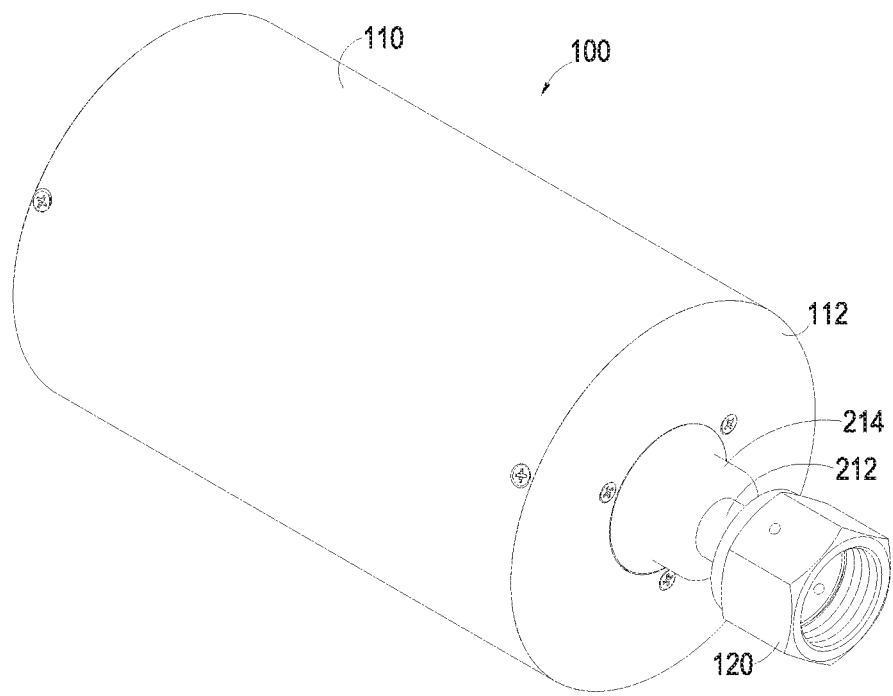
FIG. 1 illustrates a perspective view of a conventional pressure sensing unit capable of coupling to a pressure source, the view looking at the pressure port on the proximal end of the pressure sensing unit.
Figure 2:
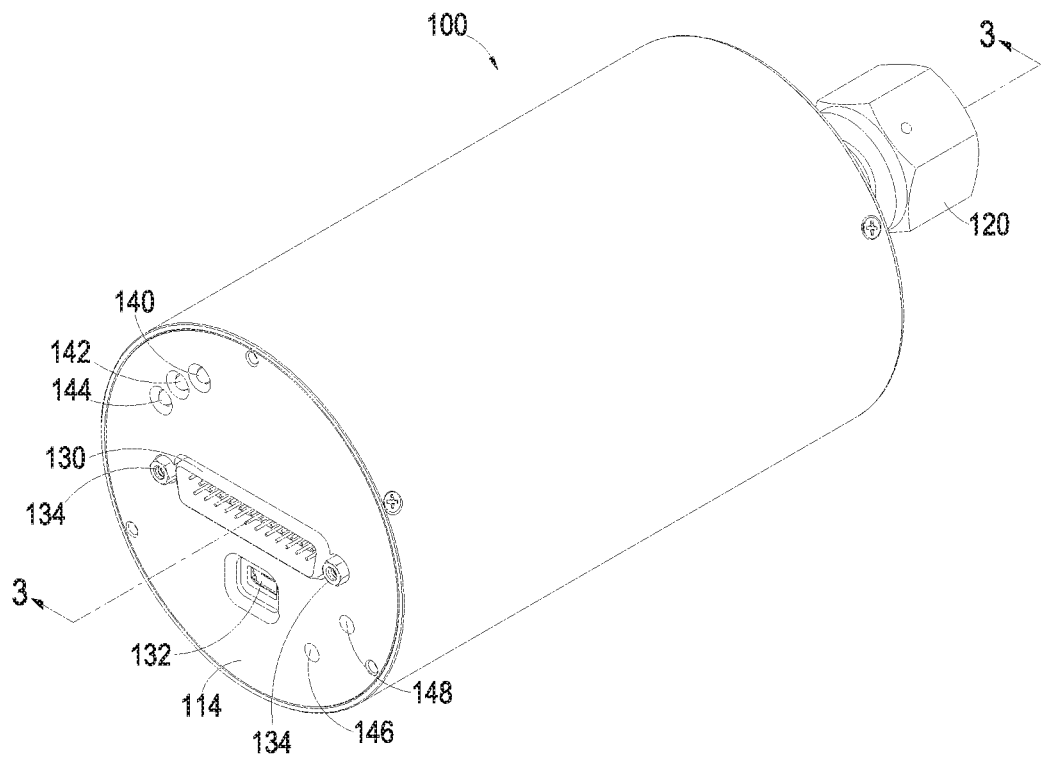
FIG. 2 illustrates a perspective view of the conventional pressure sensing unit of FIG. 1, which is rotated 180 degrees with respect to the orientation in FIG. 1, the view looking at the distal end of the pressure sensing unit.

FIGS. 1 and 2 illustrate front and rear views, respectively, of a conventional capacitance diaphragm gauge (CDG) pressure measurement unit 100. The unit comprises a generally cylindrical outer shell 110. A front anchor plate 112 is attached to the outer shell near the front (proximal end) of the outer shell. A rear face plate 114 is attached to the outer shell near the rear (distal end) of the outer shell.

A pressure port 120 extends proximally from the front anchor plate 112. The pressure port is removably attachable to a source (not shown) of a pressure to be measured. The illustrated pressure port comprises a female hexagonal (hex) coupler having internal threads that are engageable (capable of engaging) with the male outer threads of a mating coupler (not shown) associated with the pressure source. For example, the pressure port may be coupled to a system that provides gases to equipment used for semiconductor fabrication.

The rear face plate 114 supports a first connector 130 and a second connector 132. In the illustrated embodiment, the first connector is a conventional 25-pin D-subminiature connector that enables other devices (not shown) to communicate with the pressure measurement unit 100. The first connector may also be a 15-pin connector or other suitable connector. The first connector provides an analog output signal having a range of 0 to 10 volts, which represents the pressure measured by the pressure measurement unit. The first connector 130 is attached to the rear face plate 114 via a pair of mounting screws 134. In the illustrated embodiment, the second connector 132 is a conventional USB (Universal Serial Bus) connector, which may also be used to provide communication to and from the pressure measurement unit. For example, the USB connector provides a user interface to the electronics within the pressure measurement unit.

The rear face plate also supports a first light-emitting diode (LED) 140, a second LED 142 and a third LED 144. The three LEDS provide visual indications of the operational status of the pressure measurement unit 100. In the illustrated embodiment, the first LED emits light to indicate that the pressure measurement unit is powered up; the second LED emits light to indicate that the pressure measurement unit has reached a nominal operating temperature; and the third LED emits light to indicate that the pressure measurement unit is zeroed properly. The rear face plate provides access to a first recessed pushbutton switch 146 and a second recessed pushbutton switch 148. The first switch is engageable by a stylus or other slender object to manually zero the pressure measurement unit. The second switch is engageable to manually reset the pressure measurement unit.

Figure 3:
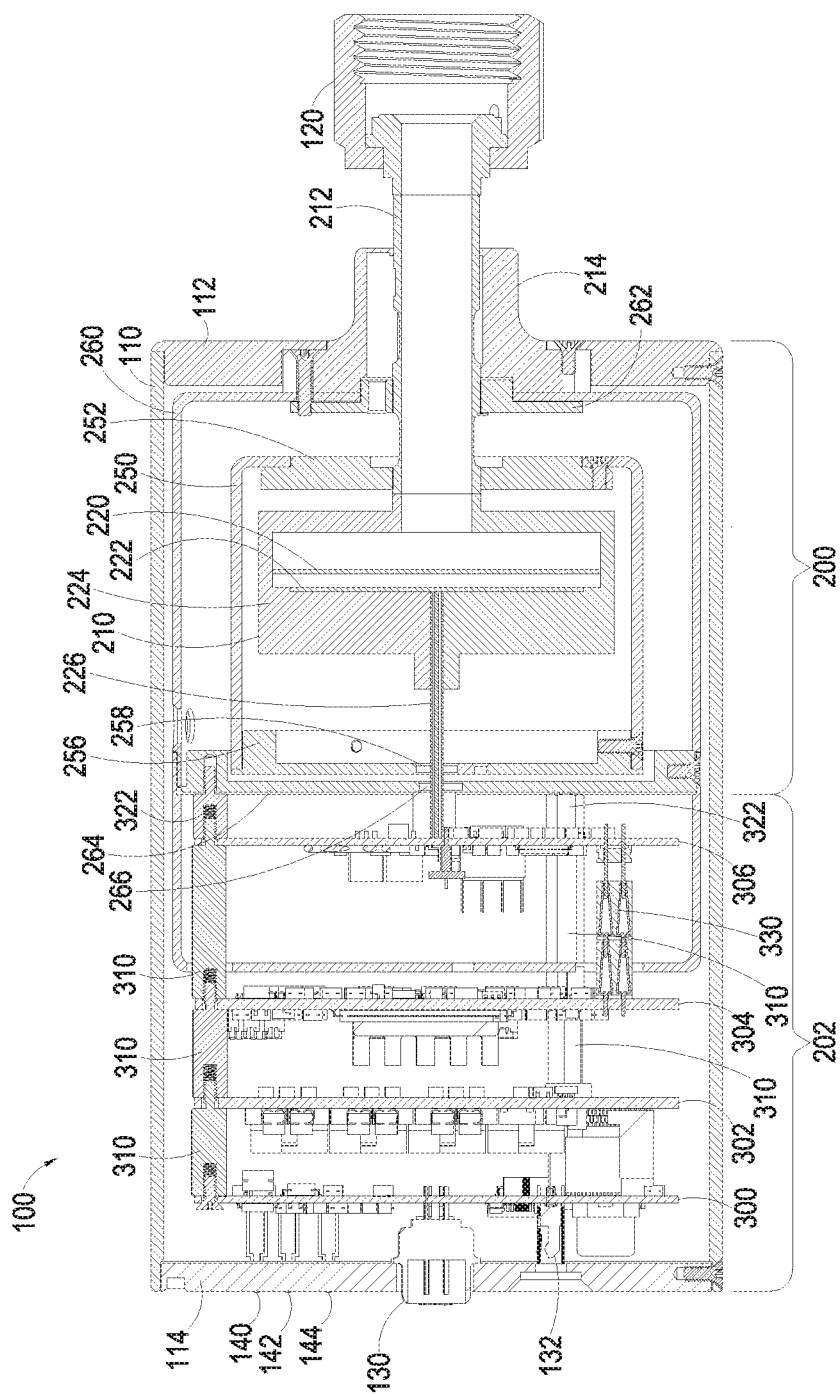
FIG. 3 illustrates a cross-sectional view of the conventional pressure sensing unit of FIGS. 1 and 2, the view in FIG. 3 taken along the line 3-3 in FIG. 2.
Figure 4:
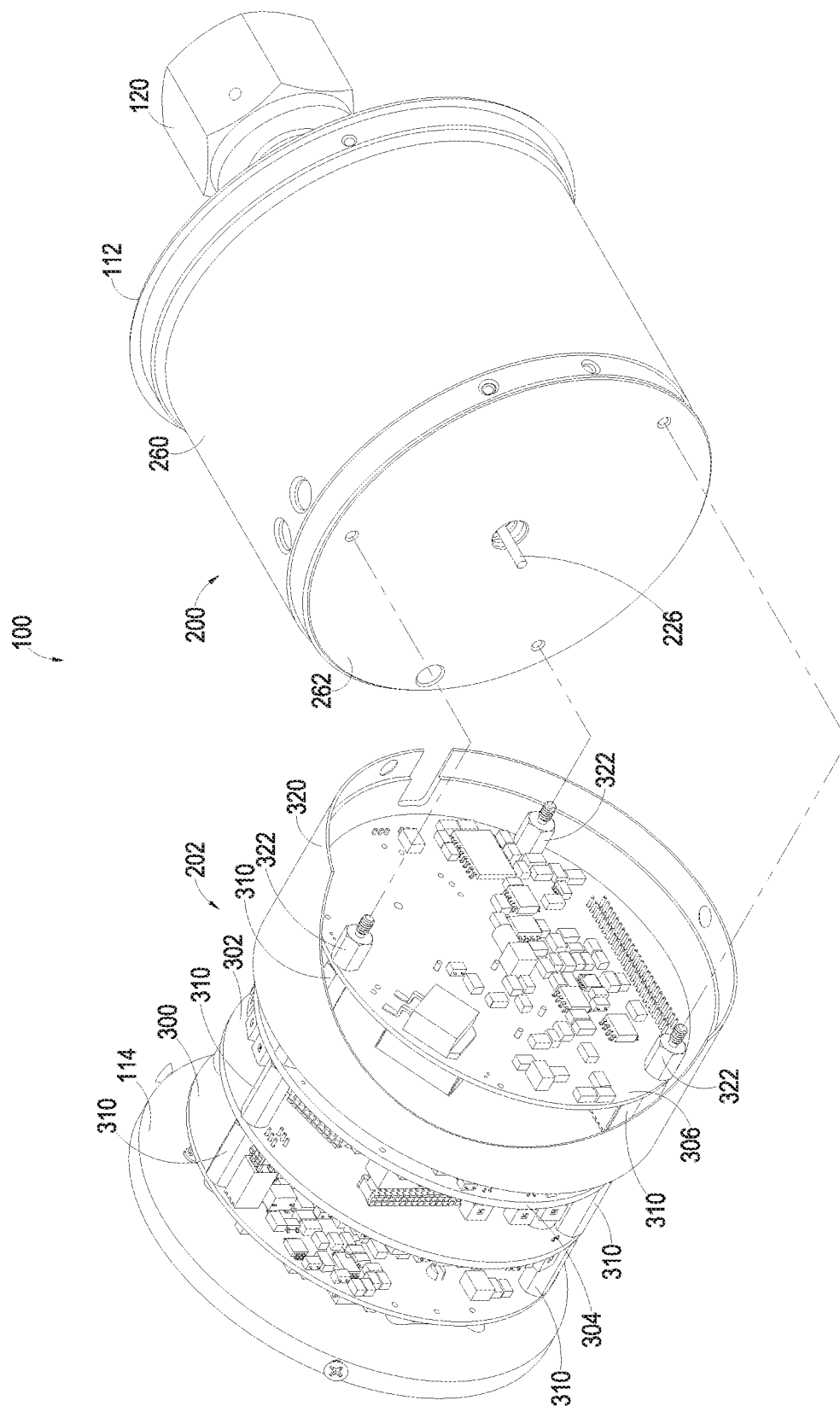
FIG. 4 illustrates an exploded view of the conventional pressure sensing unit of FIGS. 1 and 2, the view showing the distal electronics section disconnected from the proximal sensor section.

As shown in the cross-sectional view of FIG. 3 and in the partially exploded view in FIG. 4, the pressure measurement unit comprises two distinct sections. A front (proximal) section 200 is referred to herein as the sensor section and is also referred to as the high temperature section. A rear (distal) section 202 is referred to herein as the electronics section and is also referred to as the low temperature section.

The front section 200 includes a capacitance diaphragm gauge (CDG) 210, which is coupled to the pressure port 120 via an inlet tube 212. The inlet tube is supported by an insulating adapter 214. The insulating adapter is secured to the front anchor plate 112. The CDG is represented in a simplified form in FIG. 3. The CDG comprises a thin diaphragm 220, which is spaced apart from a fixed electrode 222. The diaphragm and the electrode are supported by a support structure (or CDG housing) 224. The diaphragm and the electrode are electrically connected to a coaxial conductor 226, which extends distally from the CDG 210. The electrical connections from the diaphragm and the fixed electrode to the coaxial conductor are not shown in FIG. 3. Basically, the coaxial conductor communicates a signal that varies in response to changes in the capacitance between the thin diaphragm and the fixed electrode. The changes in capacitance are caused by changes in the pressure applied to the surface of the thin diaphragm from the gases input via the inlet tube. Various techniques for processing the capacitance changes to determine pressure are known and are not discussed herein.

The CDG 210 is surrounded by a generally cylindrical high temperature oven enclosure 250. A proximal end of the high temperature oven enclosure is secured to a first (proximal) high temperature oven cover 252. A central opening in the first high temperature oven cover is press-fit to the inlet tube 212. A distal end of the high temperature oven enclosure is secured to a second (distal) high temperature oven cover 256. The coaxial conductor 226 from the CDG 210 extends distally through a central opening 258 in the second high temperature oven cover.

The high temperature oven enclosure 250 includes electrical heating elements (not shown) positioned on the inner surface of the high temperature oven enclosure. The heating elements receive electrical power via electrical conductors (not shown) and generate sufficient heat to maintain the CDG 210 at a first selected elevated temperature (e.g., in excess of 200 degrees centigrade). As discussed above, heating the CDG to the highly elevated temperature reduces the deposition of contaminates onto the diaphragm of the CDG. The high temperature oven enclosure includes temperature sensors (not shown) that are monitored to determine the temperature of the high temperature oven enclosure so that the heating elements can be controlled to maintain the high temperature oven at the first selected elevated temperature.

The high temperature oven enclosure 250 is surrounded by a medium temperature oven enclosure 260. A proximal end of the medium temperature oven enclosure is secured to a first (proximal) medium temperature oven cover 262. A center opening in the first medium temperature oven cover is press-fit to the inlet tube 212. The insulating adapter 214 is secured to the first medium temperature oven cover. A distal end of the medium temperature oven enclosure is secured to a second (distal) medium temperature oven cover 264. The coaxial conductor 226 from the CDG 210 extends distally through a central opening 266 in the distal medium temperature oven cover.

The medium temperature oven enclosure 260 includes electrical heating elements (not shown) positioned on the inner surface of the medium temperature oven enclosure. The heating elements receive electrical power via electrical conductors (not shown) and generate sufficient heat to maintain the cavity of the medium temperature oven at a second selected elevated temperature (e.g., around 70 degrees centigrade), which is lower than the first selected elevated temperature. The medium temperature oven includes temperature sensors (not shown) that are monitored to determine the temperature of the medium temperature oven so that the heating elements can be controlled to maintain the medium temperature oven at the second selected elevated temperature.

In the illustrated embodiment, the rear (electronics) section 202 of the pressure measurement unit 100 comprises four generally circular printed circuit boards (PCBs), which include a first (I/O) PCB 300, a second (power supply) PCB 302, a third (DSP) PCB 304, and a fourth (analog) PCB 306. The four PCBs are mechanically stacked as shown in FIGS. 3 and 4 and are electrically interconnected by conventional interconnection devices. The four PCBs are maintained in a stable fixed spaced-apart relationship by a plurality of PCB interconnect standoffs 310.

The I/O PCB 300 is at the distal end of the stack of PCBs. The I/O PCB is an input/output PCB that supports electronic circuitry that provides the electrical connections to the first connector 130 and the second connector 132. The I/O PCB also selectively provides electrical power to the three LEDs 140, 142, 144 to selectively illuminate the LEDs to provide a visually perceptible indication of the operational conditions of the pressure measurement unit. The I/O PCB also senses the activations of the two pushbutton switches 146, 148. The I/O PCB relays communications between the other PCBs and the first and second connectors.

The second (power supply) PCB 302 supports power supply electronics. The power supply electronics converts the input power received from the first connector 130 via the I/O board 300 into voltages required for the operation of the electronic circuitry on the other PCBs.

The third (DSP) PCB 304 supports digital signal processing electronics. The fourth (analog) PCB 306 receives the analog signals from the CDG 210 via the coaxial conductor 226 and buffers the analog signals. The analog PCB provides the buffered analog signals to the DSP PCB. The DSP PCB digitizes the analog signals and performs digital signal processing algorithms on the digitized signals to generate data representing the pressure applied to the thin diaphragm 220 within the CDG 210. The analog PCB also generates the voltages to control the heating elements in the high temperature oven 250 and the medium temperature oven 260. The analog PCB receives signals from the temperature sensors within the two ovens. The DSP PCB controls the heating elements to maintain the oven temperatures at the first and second selected temperatures.

As further shown in FIGS. 3 and 4, the analog PCB 306 is surrounded by an electronics oven enclosure 320, which has heating elements (not shown) and temperature sensors (not shown). The DSP PCB controls the heating elements of the electronics oven enclosure to maintain the analog circuitry at a substantially constant stable temperature (e.g., 70 degrees centigrade) such that variations in the operation of the analog circuit on the analog PCB that may be caused by variations in the operating temperature are substantially reduced or eliminated. When the rear section 202 is coupled to the front section as shown in the cross-sectional view of FIG. 3, the medium temperature oven cover 262 substantially closes the proximal end of the electronics oven enclosure. The analog PCB 306 is mechanically coupled to the medium temperature oven cover by a plurality of section interconnect standoffs 322, which couple the rear section 202 to the front section 200.

Although the PCBs 300, 302, 304, 306 are described starting from the distal end of the rear (electronics) section 202, the rear section is assembled starting at the proximal end by first attaching the proximal ends of the section interconnect standoffs 322 to the distal end of the front section 200. The analog (fourth) PCB 306 is then attached to the distal ends of the section interconnect standoffs with the proximal ends of a first set of three PCB interconnect standoffs 310. The analog PCB is also electrically connected to the coaxial conductor 226 and to other interconnect wiring (not shown) from the front section. The electronics oven enclosure 320 is positioned over the analog PCB. The DSP (third) PCB 304 is then mechanically attached to the analog PCB by a second set of three PCB interconnect standoffs that engage the distal ends of the first set of PCB interconnect standoffs. The DSP PCB is also electrically connected to the analog PCB by a plurality of PCB board interconnection elements 330, which pass through a portion of the electronics oven enclosure. The power supply (second) PCB 302 is then connected to the DSP PCB by a third set of three PCB interconnect standoffs that engage the distal ends of the second set of PCB interconnect standoffs. The power supply PCB is also electrically connected to the DSP PCB by a plurality of PCB board interconnection elements (not shown), which may be similar to the board interconnection elements 330. The 110 (first) PCB 300 is then attached to the distal ends of the third set of PCB interconnect standoffs. The 110 PCB is also electrically connected to the power supply PCB by a plurality of PCB board interconnection elements (not shown), which may be similar to the board interconnection elements 330. The first connector 130 and the second connector 132 extend from the distal surface of the 110 PCB and are electrically connected to the 110 PCB.

As discussed above, the cylindrical outer shell 110 is secured to the rear face plate 114 and to the front anchor plate 112, which also couples the rear section to the front section. Therefore, the two sections are held together in a fixed mechanical relationship.

As shown in FIGS. 3 and 4, the front (pressure sensor) section 200 and the rear (electronics) section 202 are closely coupled both mechanically and thermally. Insulation (not shown) surrounding portions of the high temperature oven 250 partially inhibits heat transfer from the high temperature oven into the medium temperature oven 260 such that the medium temperature oven can be maintained at a lower temperature than the temperature of the CDG 210 in the high temperature oven. Additional insulation (not shown) surrounding portions of the medium temperature oven partially inhibits heat transfer from the medium temperature oven 260 into the electronics oven enclosure 320 such that the analog board 306 may be maintained at a lower temperature than the temperature in the medium temperature oven. Because of the small overall sizes of the components and the limited space for insulation in the conventional pressure measurement unit 100 of FIGS. 1-4, a typical maximum temperature for the CDG is in the range of approximately 80 degrees centigrade to 100 degrees centigrade while maintaining the temperature of the analog PCB at no more than approximately 70 degrees centigrade. As discussed above, the conventional pressure measurement unit generally cannot exceed this range of maximum temperatures without exceeding a maximum allowable temperature for the analog PCB. Furthermore, increasing the temperature of the PCB may exceed a maximum safe temperature for the cylindrical outer shell 110, which may be touched by an operator.

FIGS. 5-16 illustrate an embodiment of a pressure measurement unit 500 of the disclosed invention, which substantially reduces the heat transfer from the heated CDG to the electronics. The pressure measurement unit includes a front (proximal) section MO and a rear (distal) section 512. The front section 510 may also be referred to as the high temperature section or the sensor section. The rear section 512 houses the electronics as described above. In the illustrated embodiment, the rear section comprises the same or substantially the same components and other features as the previously described rear section 202, and the corresponding element numbers for the rear section are carried forward to the pressure measurement unit of the disclosed invention. The front section of the improved pressure measurement unit includes the CDG 210 and other related elements and features that are described referring to FIGS. 1-4. Features in the front section that differ from the previously described front section are described below.

Figure 5:
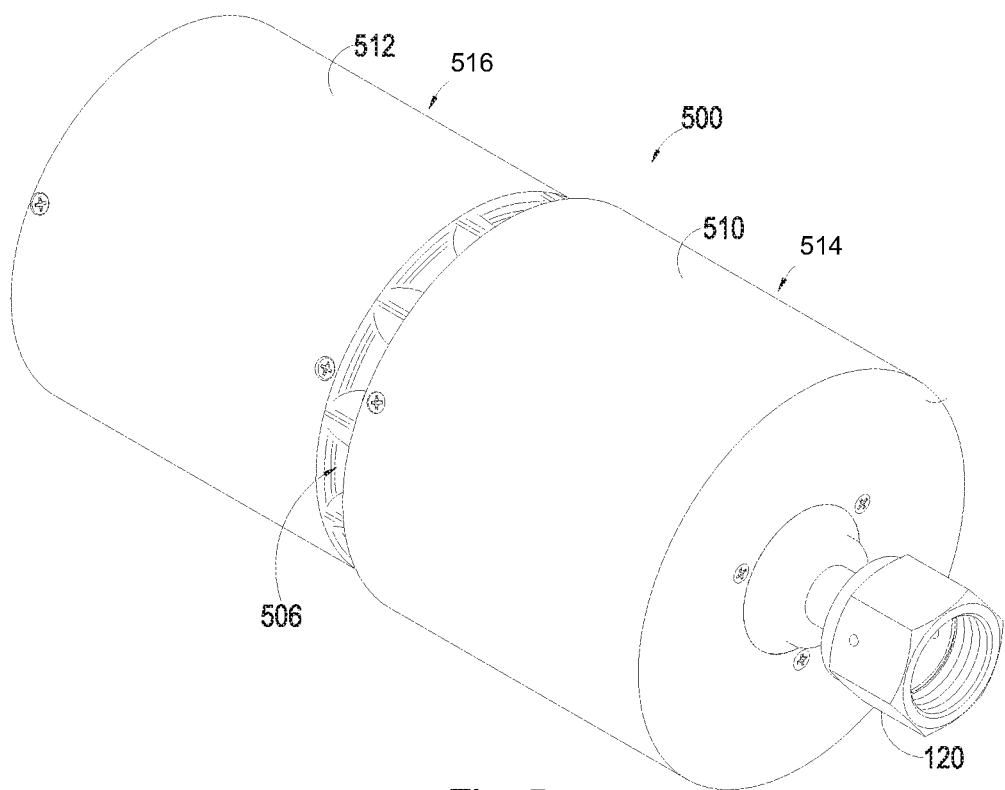
FIG. 5 illustrates a perspective view of an improved pressure sensing unit capable of coupling to a pressure source, the view looking at the pressure port on the proximal end of the pressure sensing unit.
Figure 6:
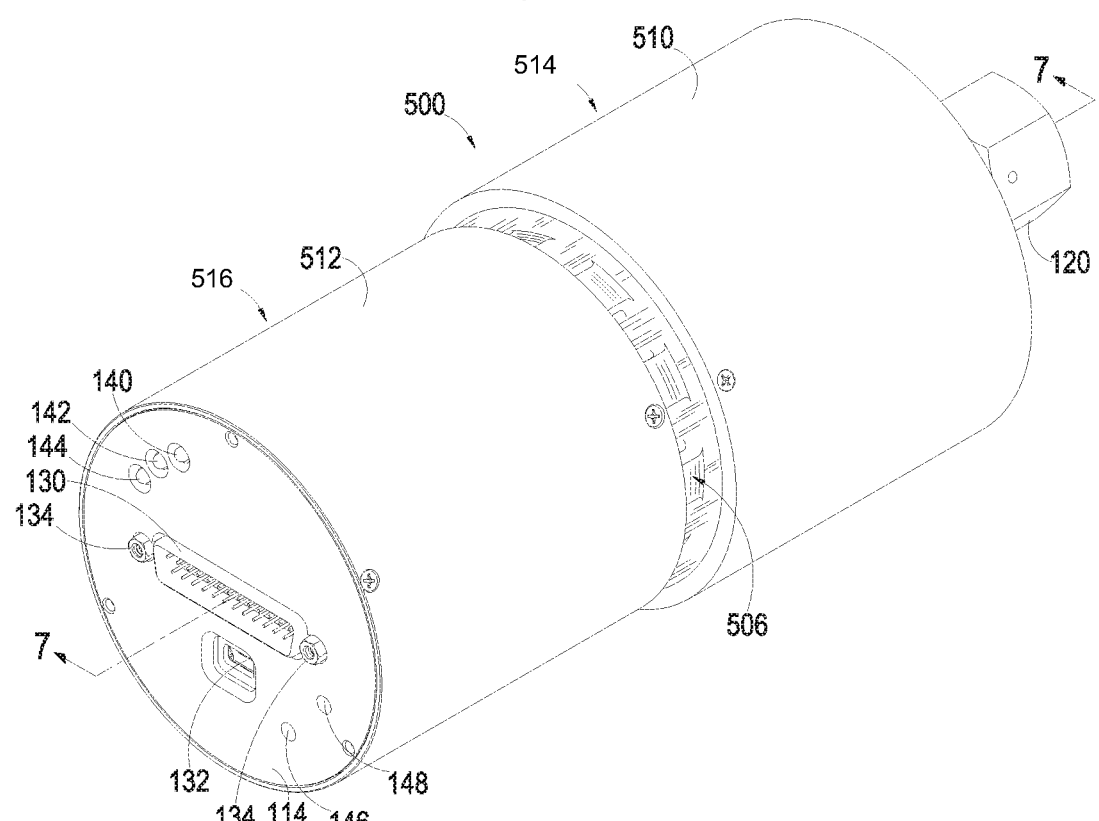
FIG. 6 illustrates a perspective view of the improved pressure sensing unit of FIG. 5, which is rotated 180 degrees with respect to the orientation in FIG. 5, the view looking at the distal end of the pressure sensing unit.

Unlike the two directly interconnected sections 200 and 202 in the previously described pressure measurement unit 100 of FIGS. 1-4, the front section 510 and the rear section 512 of the improved pressure measurement system 500 are spaced apart from each other as shown in FIGS. 5-6. The front and rear sections are not interconnected by an outer cylindrical cover as shown in the conventional embodiment. Rather, the front section is surrounded by a front cylindrical outer cover 514, and the rear section is surrounded by a rear cylindrical outer cover 516. In the illustrated embodiment, the front cylindrical outer cover comprises a rigid, thermally resistant thermoplastic material, such as, for example, polyetheretherketone (PEEK). The rear outer cover may also comprise PEEK; however, other materials (e.g., metal) may also be used.

Figure 7:
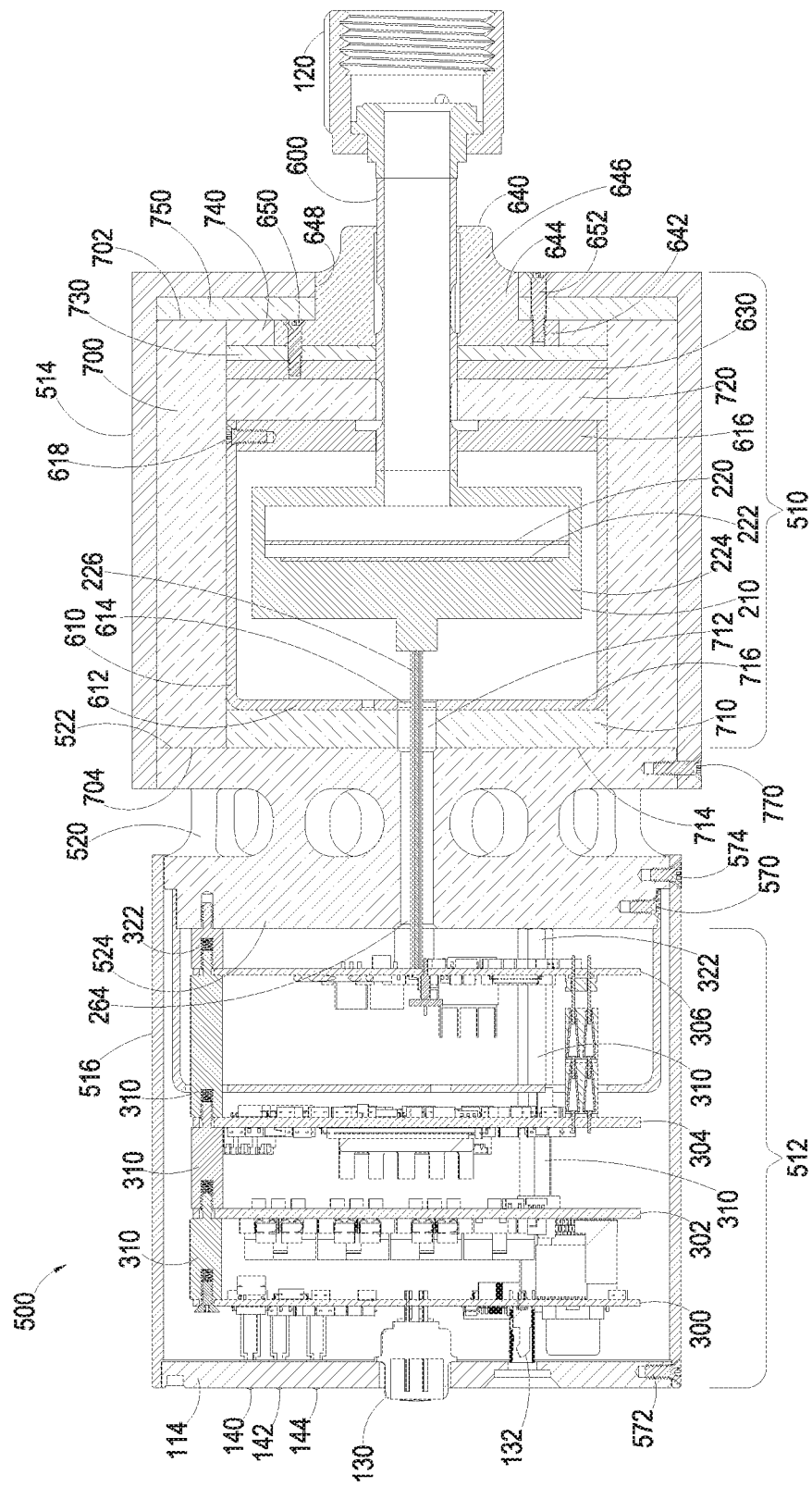
FIG. 7 illustrates a cross-sectional view of the improved pressure sensing unit of FIGS. 5 and 6, the view in FIG. 7 taken along the line 7-7 in FIG. 6.
Figure 8:
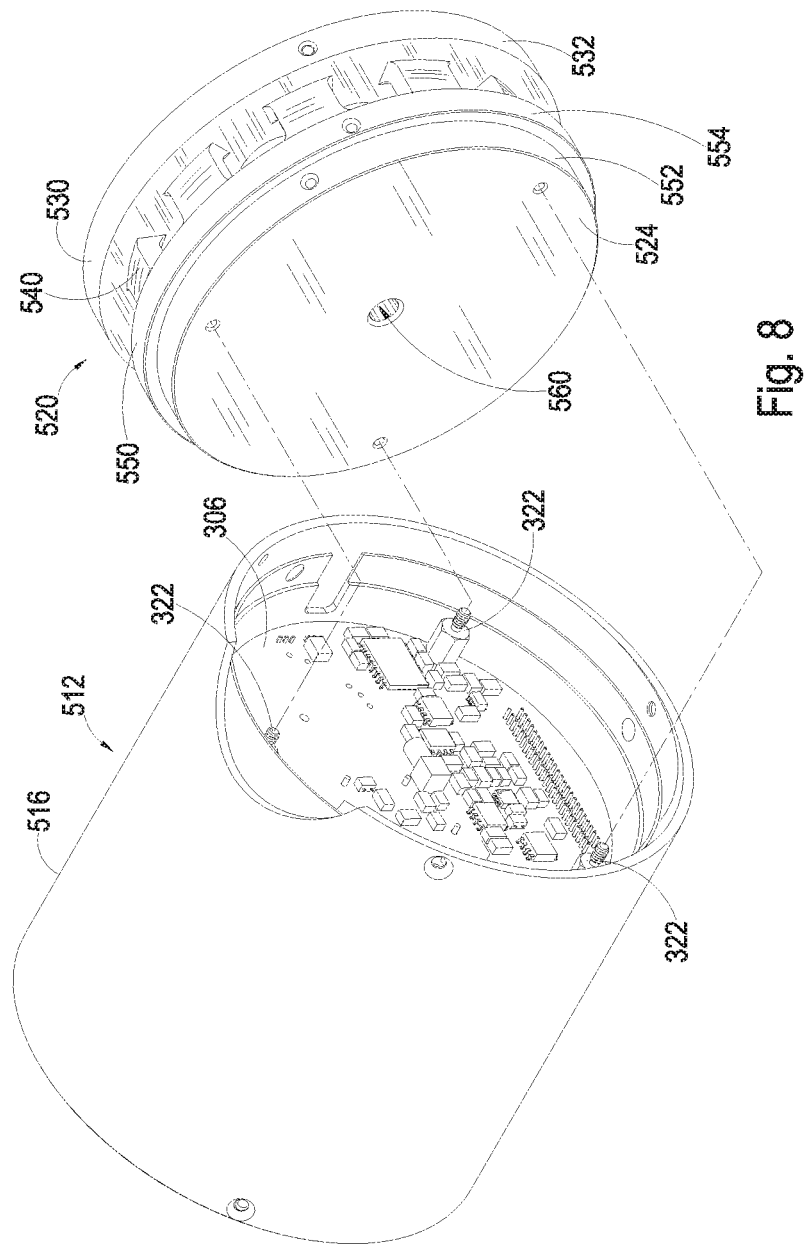
FIG. 8 illustrates an exploded perspective view of the distal electronics section of the improved pressure sensing unit of FIGS. 5 and 6 and further showing the thermal barrier prior to attachment of the distal portion of the thermal barrier to the distal electronics section.
Figure 9:
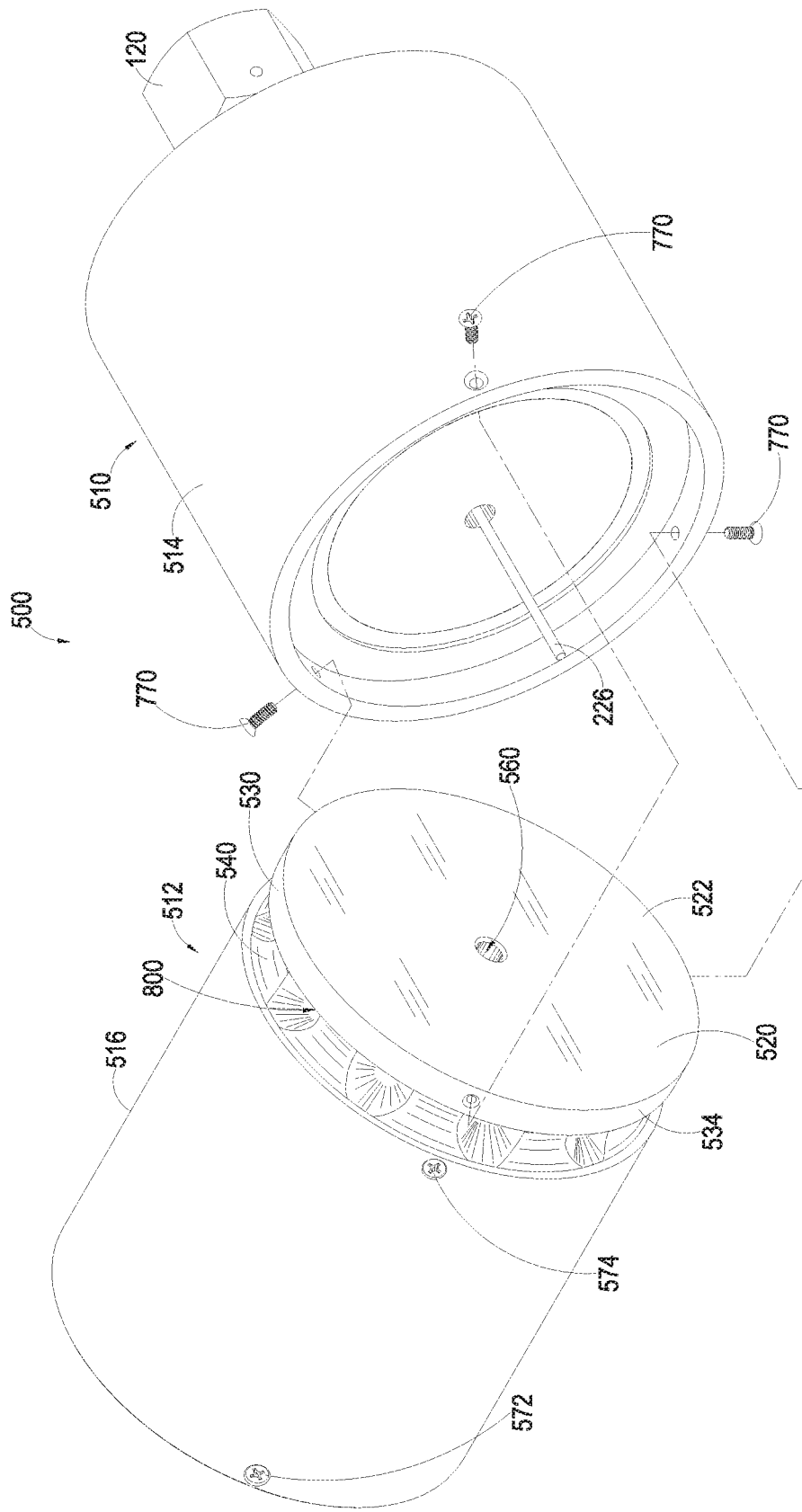
FIG. 9 illustrates an exploded perspective view of the distal electronics section and the attached thermal barrier of the improved pressure sensor unit and further showing the proximal sensor section prior to attachment of the proximal sensor section to the proximal portion of the thermal barrier.

With reference to FIG. 7, the front section 510 and the rear section 512 are mechanically interconnected by a thermal barrier 520. The thermal barrier extends between a first (proximal) surface 522 and a second (distal) surface 524. The first and second surfaces are circular. In one embodiment, the thermal barrier in the illustrated embodiment comprises a rigid, thermally resistant thermoplastic material, such as, for example, PEEK, which is commercially available from many sources. In other embodiments, the thermal barrier may comprise polyetherimide (PEI), a high-strength amorphous polymer with heat resistance. For example, PEI is commercially available as Ultem® PEI from SABIC of Saudi Arabia. In other embodiments, the thermal barrier may comprise polysulfone (PSU), which is commercially available from many sources.

With reference to FIGS. 8-14, the thermal barrier 520 includes proximal mounting portion 530, An intermediate thermal restriction and ventilation portion 540, and distal mounting portion 550. The proximal mounting portion 530 is disc-shaped. The proximal mounting portion 530 extends from the first surface 522 of the thermal barrier to a distal surface 532 of the proximal mounting portion to define a first selected distance D1 (See FIG. 12). In the illustrated embodiment, the first distance D1 is approximately 6 millimeters (approximately 0.25 inch). A circumferential outer surface 534 of the proximal mounting portion and the first surface have a mutual outer diameter of approximately 81 millimeters (approximately 3.2 inches). As described below, the proximal mounting portion 530 may also be considered as a first mounting interface, which couples to the front section 510.

The intermediate thermal restriction and ventilation portion 540 of the thermal barrier 520 extends from a proximal boundary at the distal surface 532 of the proximal mounting portion 530 for a second selected distance D2, which is approximately 11 millimeters (approximately 0.42 inch) in the illustrated embodiment. The structure of the intermediate thermal restriction and ventilation portion is described in more detail below.

The tiered disc-shaped distal mounting portion 550 of the thermal barrier 520 has a proximal surface 552, which forms the distal boundary of the intermediate thermal restriction and ventilation portion 540. The distal mounting portion extends from the proximal surface to the second surface 524 of the thermal barrier for a third selected distance D3. The third distance D3 is approximately 11 millimeters (approximately 0.44 inch) in the illustrated embodiment.

A first (distal) tier of the distal mounting portion 550 has a first circumferential outer surface 554, which extends from the second surface 524 of the thermal barrier 520 for approximately 6 millimeters (approximately 0.25 inch) in the illustrated embodiment. The first circumferential outer surface has a diameter corresponding to the diameter of the second surface, which is approximately 75 millimeters (approximately 2.95 inches) in the illustrated embodiment. A second tier of the distal mounting portion extends from the first tier to the intermediate thermal restriction and ventilation portion 540. The second tier has a second (proximal) circumferential outer surface 556, which extends from the first tier of the distal mounting portion to the intermediate thermal restriction and ventilation portion for approximately 5 millimeters (approximately 0.19 inch) in the illustrated embodiment. The second circumferential outer surface has a diameter of approximately 80 millimeters (approximately 3.132 inches) in the illustrated embodiment. As described below, the distal mounting portion 550 may also be considered as a second mounting interface, which couples to the rear section 512.

The thermal barrier 520 includes a central cylindrical through bore 560, which is positioned at or near the center of the thermal barrier. As shown in the cross-sectional view of FIG. 7, the through bore 560 allows the coaxial conductor to pass through the thermal barrier. The through bore also enables heating control conductors (not shown) and temperature sensor conductors (not shown) to extend from the analog PCB 306 for connection to the front section MO when the front section is attached to the rear section 512 via the thermal barrier as described below. The thermal barrier may also have other bores (not shown) to accommodate power wiring (not shown) from the analog PCB 306 to the heating elements (not shown) in ovens (described below) within the front section 510.

As shown in the cross-sectional view in FIG. 7, the rear (electronics) section 512 is secured to a second surface 524 of the thermal barrier 520 via the externally threaded portions of the three section interconnect standoffs 322 that were previously used in the conventional embodiment to connect the rear section directly to the front section. In the illustrated embodiment, the analog PCB 306, the electronics oven 320, the DSP PCB 304, the power supply PCB 302, the I/O PCB 300, and the rear face plate 114 are then attached to each other in sequence as described above.

After assembling the rear section 512, the electronics oven enclosure 320 in the rear section is further secured to the first cylindrical outer surface 554 of the distal mounting portion 550 of the thermal barrier 520 with three screws 570 (one shown in FIG. 7) that engage the thermal barrier at the first cylindrical outer surface. In the illustrated embodiment, the three screws are spaced apart about the first circumferential outer surface of the thermal barrier. After securing the standoffs and the electronics oven enclosure to the thermal barrier, a distal portion of the rear cylindrical outer cover 516 is secured to the rear face plate 114 of the rear section via three screws 572 (one shown in FIG. 7). A proximal portion of the rear cylindrical outer cover is secured to the thermal barrier at the second circumferential outer surface 556 of the thermal barrier via three screws 574 (one shown in FIG. 7). The larger diameter of the second cylindrical outer surface allows the outer cover to fit over the electronics oven enclosure. The three sets of attachments maintain the rear section in a stable, fixed mechanical relationship with the thermal barrier.

As noted above, the front section 510 includes the CDG 210. As shown in the cross-sectional view in FIG. 7, the CDG includes the thin diaphragm 220 and the fixed electrode 222 as described above. The coaxial conductor 226 extends from the distal end of the CDG. Again, the electrical connections between the coaxial conductor and the diaphragm and fixed electrode are not shown. The CDG is secured to the distal end of an inlet tube 600. The proximal end of the inlet tube is secured to the inlet port 120 as described above.

The CDG 210 is positioned within a generally cylindrical high temperature oven enclosure (or oven enclosure) 610. A distal end 612 of the high temperature oven enclosure is closed except for a central opening 614. The coaxial conductor 226 from the CDG extends through the central opening. A proximal end of the high temperature oven enclosure is secured to a proximal end cover 616 via a plurality of screws 618 (e.g., three screws with only one shown in FIG. 7). A central opening of the proximal end cover is press-fit onto the inlet tube to support the high temperature oven enclosure in a fixed relationship to the CDG within the high temperature oven enclosure.

A disc-shaped adapter support structure 630 is also press-fit onto the inlet tube 600. The adapter support structure is spaced apart proximally from the proximal end cover of the high temperature oven enclosure 610 by a first selected support structure spacing distance. An insulating adapter 640 is positioned on the inlet tube and has a distal surface spaced apart from the adapter support structure 630 by a second selected support structure spacing distance. The insulating adapter includes a distal base portion 642 having a first largest diameter. A second middle portion 644 of the insulating adapter has a second diameter smaller than the first diameter. A third, proximal portion 646 of the insulating adapter has a third diameter smaller than the second diameter. The middle portion of the insulating adapter extends through an opening 648 in the front cylindrical outer cover 514. The distal base portion of the insulating adapter is secured to the adapter support structure by a first plurality of adapter screws 650 (e.g., three screws with only one shown in FIG. 7). The distal portion of the insulating adapter is also secured to the cylindrical front section outer cover by a second plurality of adapter screws 652 (e.g., three screws with only one shown in FIG. 7).

Unlike the previously described embodiment of FIGS. 1-4, the illustrated embodiment of the pressure measurement unit 500 of the disclosed invention does not include a middle temperature oven enclosure. Rather, the cylindrical outer shell of the high temperature oven enclosure 610 is surrounded by a thick, cylindrical insulation layer 700 having a proximal end 702 and a distal end 704. In the illustrated embodiment, the cylindrical insulation layer comprises a layer of insulating material, such as, for example, densified Solimide® foam, which is a densified polyimide foam that is commercially available from Boyd Corporation of Pleasanton, Calif. The material is a high-temperature gasket material that is available in preformed shapes (e.g., cylinders and disks) and that may be cut to fit. The material also has sufficient compliance to enable the material to be forced into tight-fitting locations. The material has a low thermal conductivity (e.g., approximately 1.4 times the thermal conductivity of air). Other materials having low thermal conductivity and similar mechanical characteristics may also be used.

The inner surface of the cylindrical insulation layer is sized to fit snugly around the cylindrical high temperature oven enclosure 610. The outer diameter is sized to fit snugly within the front cylindrical outer cover 514. For example, in the illustrated embodiment, the cylindrical insulation layer 700 has an outer diameter of approximately of approximately 81 millimeters (approximately 3.2 inches), an inner diameter of approximately 60 millimeters (approximately 2.34 inches), and a length from the proximal end 702 to the distal end 704 of approximately 67 millimeters (approximately 2.63 inches). When the thermal barrier 520 is attached to the front section 512 as shown in FIG. 7, the distal end of the cylindrical insulation layer 700 is positioned against the proximal surface 522 of the thermal barrier 520.

A first disc-shaped insulation layer 710 is positioned within the cylindrical insulation layer 700 adjacent to the distal end of the cylindrical insulation layer. In the illustrated embodiment, the first disc-shaped insulation layer 710 has an outer diameter of approximately 60 millimeters (approximately 2.34 inches) and has a proximal-to-distal thickness of approximately 5 millimeters (approximately 0.19 inch). The first disc-shaped insulation layer 710 has a central opening 712 to allow the coaxial conductor 226 to extend through. A distal surface 714 of the first disc-shaped insulation layer 710 is generally coplanar with the distal end of the cylindrical layer and is positioned against the proximal surface 522 of the thermal barrier 520. When the thermal barrier 520 is attached to the front section 512 as shown in FIG. 7, a proximal surface 716 of the first disc-shaped layer is positioned adjacent to the distal end surface 612 of the high temperature oven enclosure 610. In the illustrated embodiment, the first disc-shaped insulation layer comprises densified Solimide® foam, as described above. Other materials having low thermal conductivity and similar mechanical characteristics may also be used.

A second disc-shaped insulation layer 720 is positioned within the cylindrical layer between the proximal surface of the proximal end cover 616 of the high temperature oven enclosure 610 and the adapter support structure 630. The second disc-shaped insulation layer 720 has a diameter of approximately 60 millimeters (approximately 2.34 inches) and has a proximal-to-distal thickness of approximately 7 millimeters (approximately 0.256 inch). The second disc-shaped insulation layer 720 has a central opening sized to accommodate the outer diameter of the inlet tube, which is approximately 13 millimeters (approximately 0.5 inch) in the illustrated embodiment. In the illustrated embodiment, the second disc-shaped insulation layer comprises densified Solimide® foam, as described above. Other materials having low thermal conductivity and similar mechanical characteristics may also be used.

A third disc-shaped insulation layer 730 is positioned between the adapter support structure 630 and a distal surface of the insulating adapter 640. The third disc-shaped insulation layer 730 has an outer diameter of approximately 60 millimeters (approximately 2.34 inches) and has a proximal-to-distal thickness of approximately 2 millimeters (approximately 0.09 inch). The third disc-shaped insulation layer 730 has a central opening sized to accommodate the outer diameter of the inlet tube. When the insulating adapter is secured to the adapter support structure, the third disc-shaped insulation layer is secured between the adapter support structure and the insulating adapter. In the illustrated embodiment, the third disc-shaped insulation layer comprises densified Solimide® foam, as described above. Other materials having low thermal conductivity and similar mechanical characteristics may also be used.

A first annular insulation layer 740 is positioned around the distal base portion 642 of the insulating adapter 640. The first annular insulation layer has a thickness of approximately 4 millimeters (approximately 0.145 inch), which corresponds to the thickness of the distal base portion of the insulating adapter. The first annular insulation layer 740 has an outer diameter of approximately 60 millimeters (approximately 2.34 inches) and has an inner diameter of approximately 45 millimeters (approximately 1.75 inches), which corresponds to the outer diameter of the distal base portion of the insulating adapter. In the illustrated embodiment, the first annular insulation layer comprises densified Solimide® foam, as described above. Other materials having low thermal conductivity and similar mechanical characteristics may also be used.

A second annular insulation layer 750 is positioned around a first portion of the middle portion 644 of the insulating adapter 640. The second annular insulation layer 750 has a thickness of approximately 4 millimeters (approximately 0.145 inch), which corresponds to approximately one-half the thickness of the middle portion of the insulating adapter. The second annular insulation layer has an outer diameter of approximately of approximately 81 millimeters (approximately 3.2 inches), which corresponds to the outer diameter of the cylindrical insulation layer 700, and which corresponds to the inner diameter of the front cylindrical outer cover 514 as described above. Accordingly, an outer distal portion of the second annular insulation layer rests against the proximal end 702 of the cylindrical insulation layer 700. The second annular insulation layer 750 has an inner diameter of approximately 32 millimeters (approximately 1.25 inches), which corresponds to the outer diameter of the middle portion of the insulating adapter. When the insulating adapter is secured to the proximal end of the front cylindrical outer cover, an inner portion of the second annular insulation layer is secured between the proximal end of the front cylindrical outer cover and the base portion of the insulating adapter. In the illustrated embodiment, the first annular insulation layer comprises densified Solimide® foam, as described above. Other materials having low thermal conductivity and similar mechanical characteristics may also be used.

After assembling the components of the front section 510 as described above, the distal end of the coaxial cable 226 and other conductors (not shown) are connected to the analog PCB 306 in the rear section 512. The distal end of the front cylindrical outer cover 514 is then secured to the outer cylindrical surface 534 of the proximal mounting portion 530 of the thermal barrier 520 via three screws 770 (e.g., one shown in FIG. 7). The distal end 704 of the cylindrical insulation layer 700 and the distal surface 714 of the first disc-shaped insulation layer 710 rest against the first surface 722 of the thermal barrier. As described in more detail below, the thermal barrier securely mechanically interconnects the front section and the rear section and also thermally isolates the rear section from the much hotter front section as described in more detail below.

The thermal barrier 520 is shown in more detail in FIGS. 10-16. As described above, the thermal barrier extends from the first (proximal) surface 522 to the second (distal) surface 524. The thermal barrier comprises the proximal mounting portion 530 that extends from the first surface to the proximal boundary of the thermal restriction and ventilation portion 540. The thermal barrier comprises the distal mounting portion 550 that extends from the distal boundary of the thermal restriction and ventilation portion. The features of the proximal and distal mounting portions are described above.

The thermal restriction and ventilation portion 540 provides at least three functions. The thermal restriction and ventilation portion interconnects the proximal mounting portion 530 and the distal mounting portion of the thermal barrier 520, and therefore, provides mechanical continuity between the two mounting portions. The mechanical continuity provided by the thermal barrier interconnects the front (sensor) section 510 to the rear (electronics) section 512 so that the two sections are securely maintained in a fixed relationship to each other. As further described below, the thermal restriction and ventilation portion 540 reduces the cross-sectional area of a thermal path from the proximal mounting portion 530 to the distal mounting portion 550 to thereby reduce the flow of thermal energy from the sensor section 510 to the electronics section 512. The thermal restriction and ventilation portion 540 also permits airflow, which removes thermal energy from the thermal restriction and ventilation portion and, therefore, further reduces the quantity of thermal energy that reaches the distal mounting portion and the electronics section attached to the distal mounting portion.

Figure 13:
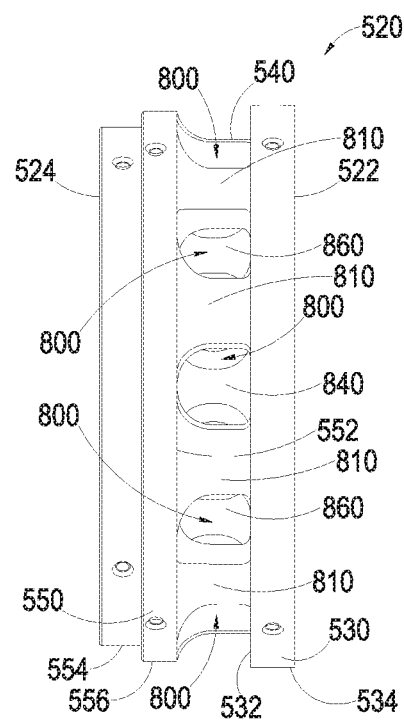
FIG. 13 illustrates a top plan view of the thermal barrier of FIGS. 10 and 11.
Figure 14:
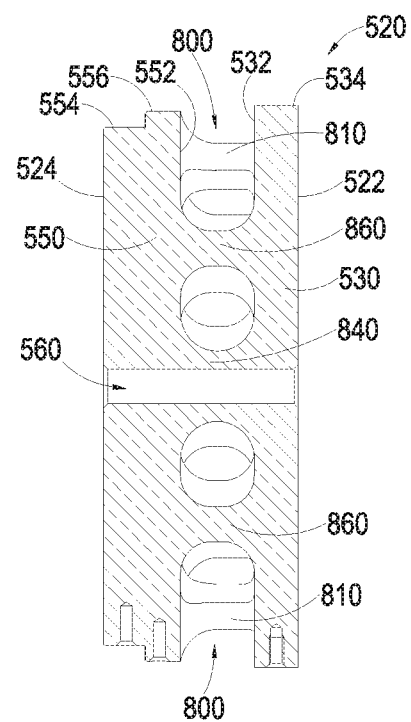
FIG. 14 illustrates a cross-sectional view of the right portion of the thermal barrier of FIGS. 10 and 11, the view taken along the line 14-14 in FIG. 10.

As shown in FIGS. 10, 11 and 13, the thermal restriction and ventilation portion 540 of the thermal barrier 520 includes a plurality of air inlets/outlets (ventilation ports) 800, which are evenly distributed around the perimeter of the thermal barrier. In the illustrated embodiment, the thermal barrier includes ten ventilation ports, which are spaced apart center-to-center by approximately 36 degrees. The ventilation ports are formed by a corresponding plurality of outer interconnection struts 810, which interconnect the proximal mounting portion 530 and the distal mounting portion 550. Each outer interconnection strut extends from the distal surface 532 of the proximal mounting portion 530 to the proximal surface 552 of the distal mounting portion 550.

As shown in the perspective cross-sectional views in FIGS. 15 and 16, each outer interconnection strut 810 has an arcuate cross-sectional shape defined by two circumferential sides and two radial sides. As shown in FIG. 15, each outer interconnection strut has an arcuate inner surface 812 positioned along a circumference having a radius of approximately 32 millimeters (approximately 1.25 inches) from the center of the distal surface 532 of the proximal mounting portion 530. Each outer interconnection strut has an arcuate outer surface 814 positioned along a circumference having a radius of approximately 36 millimeters (approximately 1.4 inches) from the center of the distal surface 532 of the proximal mounting portion 530. The arcuate outer surface is positioned approximately 5 millimeters (approximately 0.194 inches) inward from the outer circumferential surface 534 of the proximal mounting portion 530. Each outer interconnection strut has a radial thickness of approximately 4 millimeters (approximately 0.156 inch) between the arcuate inner surface 812 and the arcuate outer surface 814. The arcuate inner surface and the arcuate outer surface occupy an angle of approximately 16 degrees between a first radial surface 816 and a second radial surface 818 of the outer interconnection strut 810. Accordingly, the first radial surface of one of the outer interconnection struts is spaced apart from the second radial surface of an adjacent outer interconnection strut by approximately 20 degrees.

As further shown in FIG. 15, the arcuate inner surface 812 of each outer interconnection strut 810 is filleted with respect to the distal surface 532 of the proximal mounting portion 530. In the illustrated embodiment, each inner surface fillet has a radius of approximately 1 millimeter (approximately 0.05 inch). Each of the first radial surface 816 and the second radial surface 818 is also filleted with respect to the distal surface 532 of the proximal mounting portion 530. In the illustrated embodiment, each radial surface fillet has a radius of approximately 1 millimeter (approximately 0.05 inch). In the illustrated embodiment, the arcuate outer surface 814 of each outer interconnection strut is not filleted with respect to the distal surface of the proximal mounting portion.

Each outer interconnection struts 810 extend perpendicular to both the distal surface 532 of the proximal mounting portion 530 and the proximal surface 552 of the distal mounting portion 550. Therefore, as shown in the cross-sectional view of FIG. 16, the arcuate inner surface 812 of each outer interconnection strut 810 is also positioned along a circumference having a radius of approximately 32 millimeters (approximately 1.25 inches) from the center of the proximal surface 552 of the distal mounting portion 550. The arcuate outer surface 814 of each outer interconnection strut is also positioned along a circumference having a radius of approximately 36 millimeters (approximately 1.4 inches) from the center of the proximal surface of the distal mounting portion. Because the second (proximal) circumferential outer surface 556 of the distal mounting portion has a smaller diameter than the circumferential outer surface 534 of the proximal mounting portion 530, the arcuate outer surface is positioned approximately 4 millimeters (approximately 0.16 inch) inward from the outer circumferential surface 534 of the proximal mounting portion.

As further shown in FIG. 16, the arcuate inner surface 812 and the arcuate outer surface 814 of each outer interconnection strut 810 is filleted with respect to the proximal surface 552 of the distal mounting portion 550. In the illustrated embodiment, each inner surface fillet has a radius of approximately 2 millimeters (approximately 0.08 inch) In the illustrated embodiment, each outer surface fillet has a radius of approximately 5 millimeters (approximately 0.2 inch). Each of the first radial surface 816 and the second radial surface 818 is also filleted with respect to the proximal surface of the distal mounting portion. In the illustrated embodiment, each radial surface fillet has a radius of approximately 5 millimeters (approximately 0.2 inch).

The intermediate thermal restriction and ventilation portion 540 of the thermal barrier 520 further includes a central interconnection strut 840. In the illustrated embodiment, the central interconnection strut 840 is positioned in concentric alignment with the central through bore 560. As shown in the cross-sectional views in FIGS. 15 and 16, the central interconnection strut has an outer surface 542, which is spaced apart from the through bore by a wall thickness. In the illustrated embodiment, the trough bore has a diameter of approximately 5 millimeters (approximately 0.2 inch), and the outer surface 542 has a diameter of approximately 10 millimeters (approximately 0.4 inch). Therefore, the wall thickness is approximately 0.1 inch. The outer surface of the central interconnection strut is filleted with respect to the distal surface 532 of the proximal mounting portion 530, as shown in FIG. 15, and is also filleted with respect to the proximal surface 552 of the distal mounting portion 550, as shown in FIG. 16. In the illustrated embodiment, both fillets have a common radius of approximately 5 millimeters (approximately 0.2 inch). Therefore, only a short middle portion of the outer surface of the central interconnection strut remains at the outer diameter of approximately 10 millimeters (approximately 0.4 inch).

The central interconnection strut 840 is surrounded by a plurality of internal interconnection struts 860. Each internal interconnection strut has a basic diameter of approximate 5 millimeters (approximately 0.2 inch) and extends from the distal surface 532 of the proximal mounting portion 530 to the proximal surface 552 of the distal mounting portion 550. The center of each internal interconnection strut is positioned approximately 20 millimeters (approximately 0.785 inch) from the center of the central interconnection strut. In the illustrated embodiment, ten internal interconnection struts are spaced equiangularly apart (i.e., with equal angles of separation) by approximately 36 degrees. As shown in FIGS. 15 and 16, each internal interconnection strut is positioned along a radial line that is positioned substantially equiangularly between a pair of adjacent outer interconnection struts 810 such that each internal interconnection strut is substantially radially aligned with a respective one of the ventilation ports 800. In other embodiments, additional internal interconnection struts may be used with respective small diameters to further distribute the cantilevered load of the rear (electronics) section 512.

In the illustrated embodiment, each of the internal interconnection struts 860 is filleted with respect to the distal surface 532 of the proximal mounting portion 530 and with respect to the proximal surface 556 of the distal mounting portion 550. In the illustrated embodiment, each fillet has a radius of approximately 5 millimeters (approximately 0.175 inch).

Although the thermal barrier 520 is illustrated as a solid PEEK material in the cross-sectional views of FIGS. 12, 14, 15 and 16, the thermal barrier is preferably constructed with infill material pattern such as, for example, a honeycomb pattern. The honeycomb fill pattern is selected to reduce the overall weight of the thermal barrier, to reduce the cost of materials and to reduce the thermal transfer across the thermal barrier from the front section 510 to the rear section 512. For example, in one embodiment, the honeycomb fill pattern is selected to have a fill volume of approximately 20 percent. The honeycomb fill pattern is achieved in the illustrated embodiment by additive manufacturing (e.g., 3-D printing). The selected fill volume is a tradeoff between reducing heat transfer and maintaining structural strength to support the cantilevered load of the rear section.

As discussed above, the thermal barrier 520 functions as a mechanical interconnection structure between the front (sensor) section 510 and the rear (electronics) section 512 of the improved pressure measurement unit 500. When connected to a system (not shown) having the pressure to be measured, the improved pressure measurement unit is supported by the pressure port 120 threaded onto a mating threaded coupling of the system. The combined masses of the front section, the thermal barrier and the rear section are supported by the mated couplings. When the improved pressure measurement unit is mounted such that the inlet tube 212 is oriented horizontally, the combined masses exert a force moment on the mated couplings. The moment exerted by the rear section in the improved pressure measurement unit is larger than the corresponding moment of the rear section 202 of the conventional pressure sensing unit 100 because of the added length of the thermal barrier between the front section and the rear section. Keeping the thickness of the thermal barrier between the proximal surface 522 and the distal surface 524 as small as practical reduces the moment of the rear section with respect to the mated couplings.

The quantity of thermal energy propagated from the front section 510 to the rear section 512 via the thermal barrier 520 depends in part on the thermal conductivity of the barrier material. For example, PEEK has a thermal conductivity of approximately 0.25 watts per meter-Kelvin (e.g., 0.25 W/m·K). Polysulfone (PSU) has a thermal conductivity of approximately 0.26 W/m·K. Polyetherimide has a thermal conductivity between approximately 0.22 W/m·K and approximately 0.12 W/m·K.

The quantity of thermal energy propagated from the front section to the rear section via the thermal barrier 520 also depends in part on the thickness of the thermal barrier between the two sections, which determines the thermal path length. An increased thickness reduces the thermal energy propagation; however, an increased thickness also increases the moment of the rear section as discussed above. Therefore, increasing the thickness of the thermal barrier is limited by an acceptable magnitude for the moment of the rear section. The thickness of the thermal barrier may also be limited by the overall length of the pressure measurement unit 500 from the pressure port 120 to the rear face plate 114. In the illustrated embodiment, a thickness of 11 millimeters (approximately 0.42 inch) provides an acceptable distance between the front and rear sections without unduly increasing the moment exerted by the rear section.

The quantity of thermal energy propagated from the front (sensor) section 510 to the rear (electronics) section 512 via the thermal barrier 520 also depends in part on the area of the material via which the thermal energy propagates. As described above, the thermal barrier has a proximal mounting portion 530, which is configured to attach to the front section, and has a distal mounting portion 550, which is configured to attach to the rear section. In the illustrated embodiment, the proximal mounting portion 530 of the thermal barrier 520 has an outer diameter of approximately 81 millimeters (approximately 3.2 inches). The distal mounting portion 550 of the thermal barrier 520 has a minimum outer diameter of approximately 75 millimeters (approximately 2.95 inches). Accordingly, the second surface 524 of the thermal barrier at the distal mounting portion has a cross-sectional area of approximately 4,415 square millimeters. If the thermal barrier was a continuous solid material between the proximal mounting portion and the distal mounting portion, the thermal barrier would transfer a large quantity of unwanted thermal energy from the front section to the rear section.

By constructing the intermediate thermal restriction and ventilation portion 540 of the thermal barrier 520 as a partially open structure comprising the plurality of outer interconnection struts 810, the central interconnection strut 840 and the plurality of plurality of internal interconnection struts 860, the effective area of the intermediate thermal restriction and ventilation portion is significantly reduced with respect to the areas of the proximal and distal mounting portions. For example, if the fillets on the respective interconnection struts are ignored in order to simplify the calculations, each of the ten outer interconnection struts 810 has a respective cross-sectional area of approximately 37 square millimeters, the central interconnection strut 840 has a cross-sectional area of approximately 61 square millimeters and each of the ten internal interconnection struts 860 has a respective cross-sectional area of approximately 20 square millimeters. Accordingly, the total cross-sectional area of the struts is approximately 631 square millimeters, which is approximately 14.3 percent of the cross-sectional area of the second surface of the thermal barrier. The energy transferred through the PEEK material of the thermal barrier is directly proportional to the cross-sectional area. Therefore, the heat transfer is reduced by approximately 85 percent by constructing the intermediate thermal restriction and ventilation portion with the struts instead of a solid material.

Adding the fillets to the struts 810, 840, 860 increases the effective cross-sectional area; however, the increased cross-sectional area remains substantially smaller than the cross-sectional of the solid PEEK material. The effective cross-sectional area is not readily calculable for the filleted struts; however, the total volume of the filleted struts can be calculated as approximately 18,681 cubic millimeters. In comparison, the total volume of the un-filleted struts can be calculated as approximately 6,792 cubic millimeters. Therefore, the volume of the filleted struts is approximately 2.75 times the volume of the un-filleted struts. In comparison, the volume of a solid version of the intermediate thermal restriction and ventilation portion 540 would be approximately 47,105 cubic millimeters. Accordingly, the volume of the un-filleted struts is approximately 14.4 percent of the volume of the solid version of the intermediate thermal restriction and ventilation portion. In contrast the volume of the filleted struts is approximately 40 percent of the solid version of the intermediate thermal restriction and ventilation portion. A total strut volume of between 30 percent and 50 percent of the solid version of the intermediate thermal restriction and ventilation portion is expected to provide a satisfactory barrier to thermal energy transfer to the second section 514 while providing sufficient structure support to the second section. Generally, the total strut volume may be in a range of approximately 15 percent to approximately 50 percent of the total volume of the intermediate thermal restriction and ventilation portion.

The heat transfer is further reduced by constructing the entire thermal barrier 520 using a honeycomb or other reduced volume infill. For example, with a honeycomb infill of approximately 20 percent by volume, the heat transfer is reduced by approximately 80 percent in comparison to the solid material. Accordingly, the combination of the strut structure of the intermediate thermal restriction and ventilation portion 540 and the honeycomb fill of the entire thermal barrier provides a substantial decrease in the heat transfer from the front section 510 to the rear section 512 of the improved pressure sensing unit 500. Furthermore, the decreased heat transfer is provided while maintaining a strong mechanical interconnection between the front section and the rear section as described above.

The reduction in the conductive heat transfer described above is further reduced by the partially open configuration of the intermediate thermal restriction and ventilation portion 540. The ventilation ports 800 allow ambient air to flow into the intermediate thermal restriction and ventilation portion between pairs of adjacent outer interconnection struts 810. The moving air absorbs heat from the outer interconnection struts. The moving air continues through the intermediate thermal restriction and ventilation portion and passes around the plurality of internal interconnection struts 860 and the central interconnection strut 840 and absorbs heat from the struts. The heated air exits from the intermediate thermal restriction and ventilation portion via other ventilation ports. The removal of heat via the air flow further reduces the heat transfer from the proximal mounting portion 530 to the distal mounting portion 550 of the thermal barrier.

In the illustrated embodiment, the thermal barrier 520 is effective to maintain the temperature at the distal surface 524 of the thermal barrier 520 at no more than approximately 50 degrees centigrade even when the temperature at the proximal surface 522 of the thermal barrier is at approximately 130 degrees centigrade. Under these conditions, the temperature of the CDG housing 224 within the high temperature oven enclosure 610 may be as high as 250 to 300 degrees centigrade.

The thermal barrier of the disclosed invention may be provided between the CDG and the electronics enclosure operating at a second temperature with the following steps. A first mounting interface having a size and a shape configured to mechanically engage the CDG is provided. A second mounting interface having a size and shape configured to engage the electronics enclosure is provided. The second mounting interface is spaced apart from the first mounting interface. The first mounting interface and the second mounting interface with a plurality of struts are interconnected. Each strut has a respective first end mechanically and thermally coupled to the first mounting interface. Each strut has a respective second end mechanically and thermally coupled to the second mounting interface.

With reference to FIGS. 17, 18, and 19A-19B, shown are another embodiment of the thermal barrier structure. The thermal barrier structure of this embodiment is formed as a form of thermal barrier enclosure in which the thermoplastic thermal barrier has been homogenized as one part with the enclosure. FIG. 17 illustrates a perspective view of an embodiment of a thermal barrier enclosure, and FIG. 18 illustrates a cross-sectional view of the embodiment of the thermal barrier enclosure taken along the line 17-17 in FIG. 17. The pressure measurement unit 900 includes a thermal barrier enclosure 910 and a rear cylindrical outer cover 920. The rear outer cover 920 houses the electronics as described above which receives signals from CDG 210 and measures the pressure of an external source connected to the pressure port 120. In the illustrated embodiment, the rear section comprises the same or substantially the same components and other features as the previously described rear sections 202 and 512, and the corresponding element numbers for the rear section are carried forward to the pressure measurement unit 900 of this embodiment of the disclosed invention. The thermal barrier enclosure 910 houses CDG 210 and other related elements. The thermal barrier enclosure 910 includes a cylindrical side wall 911 that surrounds the CDG 210 and the other related elements, a first wall 912 forming a bottom of the enclosure defined by the cylindrical side wall 911, a second wall 913 that is spaced apart from the first wall 912. The thermal barrier enclosure 910 further includes an intermediate thermal restriction and ventilation portion 914 interconnecting the first wall 912 and the second wall 913. The intermediate thermal restriction and ventilation portion 914 includes a plurality of struts 915 (major struts or first struts).

With reference to FIGS. 19A and 19B, shown are perspective views of top and bottom portions of the thermal barrier enclosure 910. FIG. 19A shows a top portion 930 of the thermal barrier enclosure 910, and FIG. 19B shows a bottom portion 931 of the thermal barrier enclosure 910. The top portion 930 and bottom portion 931 are assembled together to form the thermal barrier enclosure 910. The thermal barrier enclosure features a "clamshell" assembly method wherein the homogenized thermoplastic sensor housing/electronics thermal barrier has been sliced down the center axis to form two parts that are then screwed together to shroud the sensor. This helps with assembly in that all the heater, resistance temperature detector (RTD) and sensor wiring can be egressed through the thermal barrier enclosure 910 while the sensor is exposed to the assembly technician. The thermal barrier enclosure 910 may include a central interconnection strut 916, in which a central through bore 560 is formed, and one or more secondary interconnection struts 917 (second struts) in which secondary through bores 918 are formed. The first wall 912 and the second wall 913 are connected with the central interconnection strut 916 and the secondary interconnection struts 917. The central through bore 560 and the secondary through bore 918 are formed through the first and second walls. In an embodiment, a coaxial conductor 226 may extend from the CDG 210 to the electronics enclosed by the outer cover 920 through the central through bore 560, and wirings for the heaters, RTD and sensors may extends from the CDG 210 to the electronics through the secondary through bores 918 formed inside the secondary struts 917. This is done to egress the wirings to locations which the wirings need to go for easy mating on either the analog PCB or DSP PCB disposed in the electronics enclosed by the outer cover 920. In another embodiment, the coaxial conductor 920 and wirings for the heaters, RTD and sensors may extend through the central through bore 560 or other secondary through bores 918, depending on arrangement of elements in the electronics. As shown in FIGS. 19A and 19B, the central through bore 560 and the secondary through bores 918 may be formed on the top portion or bottom portion of the thermal barrier enclosure, or alternatively the central through bore and the secondary through bores may be formed on both the top and bottom portions of thermal barrier enclosure.

With respect to FIGS. 20A and 20B, shown are cross-sectional views of the thermal barrier enclosure taken along the line 18-18 in FIG. 17. The struts 915 are arranged on the first wall 912. In an embodiment, each strut may be positioned along a first circle 940 centered on the central through bore 560 (FIG. 20A). In another embodiment, the strut may be positioned along a respective strut radial line 941 that extends from the central through bore 560 (FIG. 20B). However, the arrangement of the struts are not limited to these configurations, and may be arranged in different configurations to effectively reduce the heat transferred from the CDG. The struts 915 may be connected to both the first wall 912 and the second wall 913. However, the struts may be connected to one of the first wall 912 and the second wall 913. For example, the struts 915 may be formed on the first wall 912 extending towards the second wall 913, but the struts 915 may not be connected to the second wall 913 by forming gaps between the struts 915 and the second wall 913. FIGS. 20A-20B also show the secondary struts 917 and secondary through bores 918 formed inside the secondary struts. For the illustration purpose, FIGS. 20A-20B show three secondary struts arranged along a vertical line, but the number of the secondary struts is not limited to three. The vertical line may represent the portions (or areas) on which the top portion 930 and the bottom portion 931 may join together to form the complete of the thermal barrier enclosure. Furthermore, the secondary struts may be arranged differently depending on the arrangements of elements in the electronics.

As described above, the intermediate thermal restriction and ventilation portion 914 includes ample space for convective cooling airflow. Because the side wall, first wall, second wall, and the intermediate thermal restriction and ventilation portion are formed integrally as one part, the struts may be formed slimmer than the struts of the embodiment shown in FIGS. 15 and 16. As a result, the thermal barrier enclosure 910 further reduces the conductive (and convective via the larger air gap) heat transfer to the electronics. The total cross-sectional area of the struts 915 may be approximately 50% of the total cross-sectional area of the struts of the embodiment shown in FIGS. 15 and 16. The intermediate thermal restriction and ventilation portion 914 has a total volume between the first wall and the second wall. The total volume includes volumes of struts, space between the first and second walls, and other elements. The plurality of struts 915 have a total strut volume. Because of the slim struts 915 of the thermal barrier enclosure 910, the total strut volume is in a range of approximately 15 percent to approximately 25 percent of the total volume of the intermediate thermal restriction and ventilation portion 914, which effectively reduces heat transfer to the electronics.

The previous detailed description has been provided for the purposes of illustration and description. Therefore, although there have been described particular embodiments of a new and useful invention, it is not intended that such references be construed as limitations upon the scope of this invention except as set forth in the following claims.

What is claimed is:

1. A thermal barrier enclosure to interconnect a capacitance diaphragm gauge (CDG) operating at a first temperature with an electronics enclosure operating at a second temperature, the first temperature greater than the second temperature, the thermal barrier enclosure comprising:
   a side wall surrounding the CDG;
   a first wall configured to mechanically engage the CDG;
   a second wall configured to engage the electronics enclosure, the second wall spaced apart from the first wall;
   a central interconnection strut connected to the first wall and the second wall, wherein the central interconnection strut defines a central through bore in which a coaxial conductor extending from the CDG is disposed, and wherein signals are transmitted between the CDG and electronics inside the electronics enclosure via the coaxial conductor; and
   an intermediate thermal restriction and ventilation portion interconnecting the first wall and the second wall, the intermediate thermal restriction and ventilation portion comprising a plurality of struts that surround the central interconnection strut.

2. The thermal barrier enclosure of claim 1 wherein the first wall has a central through bore, and each strut of the plurality of the struts is positioned along a respective strut radial line extending from the central through bore.

3. The thermal barrier enclosure of claim 1 wherein the first wall has a central through bore, and each strut of the plurality of the struts is positioned along a first circle centered on the central through bore.

4. The thermal barrier enclosure of claim 1 wherein the plurality of struts are connected to the first wall and the second wall.

5. The thermal barrier enclosure of claim 1 wherein the intermediate thermal restriction and ventilation portion has a total volume between the first wall and the second wall, the central interconnection strut and the plurality of struts have a total strut volume, and the total strut volume is in a range of approximately 15 percent to approximately 25 percent of the total volume.

6. The thermal barrier enclosure of claim 1 further comprising one or more secondary interconnection struts spaced apart from the central interconnection strut, wherein the one or more secondary interconnection struts define respective secondary through bores through which wirings extending from the CDG to electronics inside the electronics enclosure are disposed for one or more of heaters, resistance temperature detector (RTD) and sensors.

7. A pressure sensing system comprising:
   a capacitance diaphragm gauge (CDG) operating at a first temperature, wherein the CDG is capable of coupling to a source of a pressure to be measured;
   an electronics enclosure operating at a second temperature, the first temperature greater than the second temperature, the electronics enclosure enclosing electronics that are electrically coupled to the CDG; and
   a thermal barrier enclosure housing the CDG and interconnecting the CDG to the electronics enclosure, the thermal barrier enclosure comprising:
      a side wall surrounding the CDG;
      a first wall configured to mechanically engage the CDG;
      a second wall configured to engage the electronics enclosure, the second wall spaced apart from the first wall;
      a central interconnection strut connected to the first wall and the second wall, wherein the central interconnection strut defines a central through bore in which a coaxial conductor extending from the CDG is disposed, and wherein signals are transmitted between the CDG and the electronics enclosed by the electronics enclosure via the coaxial conductor; and
      an intermediate thermal restriction and ventilation portion interconnecting the first wall and the second wall, the intermediate thermal restriction and ventilation portion comprising a plurality of struts that surround the central interconnection strut.

8. The pressure sensing system of claim 7 wherein the first wall has a central through bore, and each strut of the plurality of the struts is positioned along a respective strut radial line extending from the central through bore.

9. The pressure sensing system of claim 7 wherein the first wall has a central through bore, and each strut of the plurality of the struts is positioned along a first circle centered on the central through bore.

10. The pressure sensing system of claim 7 wherein the plurality of struts are connected to the first wall and the second wall.

11. The pressure sensing system of claim 7 wherein the intermediate thermal restriction and ventilation portion has a total volume between the first wall and the second wall, the central interconnection strut and the plurality of struts have a total strut volume, and the total strut volume is in a range of approximately 15 percent to approximately 25 percent of the total volume.

12. The pressure sensing system of claim 7 further comprising an oven enclosure that encloses the CDG.

13. The pressure sensing system of claim 7 further comprising an insulation layer that fills a space between the oven enclosure and the side wall of the thermal barrier enclosure.

14. The pressure sensing system of claim 7 further comprising one or more secondary interconnection struts spaced apart from the central interconnection strut, wherein the one or more secondary interconnection struts define respective secondary through bores through which wirings extending from the CDG to the electronics enclosed by the electronics enclosure are disposed for one or more of heaters, resistance temperature detector (RTD) and sensors.

15. A thermal barrier to interconnect a capacitance diaphragm gauge (CDG) operating at a first temperature with an electronics enclosure operating at a second temperature, the first temperature greater than the second temperature, the thermal barrier comprising:

a first mounting interface configured to mechanically engage the CDG;

a second mounting interface configured to engage the electronics enclosure, the second mounting interface spaced apart from the first mounting interface;

a central interconnection strut connected to the first mounting interface and the second mounting interface, wherein the central interconnection strut defines a central through bore in which a coaxial conductor extending from the CDG is disposed, and wherein signals are transmitted between the CDG and electronics inside the electronics enclosure via the coaxial conductor; and an intermediate thermal restriction and ventilation portion interconnecting the first mounting interface and the second mounting interface, the intermediate thermal restriction and ventilation portion comprising a plurality of struts that surround the central interconnection strut.

16. . The thermal barrier of claim 15 wherein the intermediate thermal restriction and ventilation portion has a total volume between the first mounting interface and the second mounting interface, the central interconnection strut and the plurality of struts have a total strut volume, and the total strut volume is in a range of approximately 15 percent to approximately 50 percent of the total volume.

17. The thermal barrier of claim 16 wherein the total strut volume is approximately 40 percent of the total volume.

18. The thermal barrier of claim 15 wherein the plurality of struts comprise:

a plurality of outer interconnection struts, the outer interconnection struts spaced apart to provide ventilation ports between adjacent outer interconnection struts; and a plurality of internal interconnection struts, the internal interconnection struts spaced apart from each other and spaced apart from the ventilation ports to enable air flow through the intermediate thermal restriction and ventilation portion.

19. The thermal barrier of claim 18 wherein:

each of the first mounting interface and the second mounting interface has a respective central through bore;

each outer interconnection strut is positioned along a respective outer interconnection strut radial line extending from the central through bore; and each internal interconnection strut is positioned along a respective internal strut radial line extending from the central through bore, each internal strut radial line positioned with a substantially equal angle between a respective first outer interconnection strut radial line and a second outer interconnection strut radial line.

20. The thermal barrier of claim 18 wherein:

each of the first mounting interface and the second mounting interface has a respective central through bore;

each outer interconnection strut is positioned along a first circle centered on the central through bore, the first circle having a first radius; and each internal strut is positioned along a second circle centered on the central through bore, the second circle having a second radius, the second radius smaller than the first radius.

\* \* \* \* \*